US008411086B2

(12) United States Patent
Rieffel et al.

(10) Patent No.: US 8,411,086 B2
(45) Date of Patent: Apr. 2, 2013

(54) MODEL CREATION USING VISUAL MARKUP LANGUAGES

(75) Inventors: Eleanor Rieffel, Mountain View, CA (US); Donald Kimber, Foster City, CA (US); Jun Shingu, San Jose, CA (US); Chong Chen, Chicago, IL (US); James Vaughan, Sunnyvale, CA (US); Sagar Gattepally, Fremont, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1023 days.

(21) Appl. No.: 12/392,056

(22) Filed: Feb. 24, 2009

(65) Prior Publication Data
US 2010/0214284 A1    Aug. 26, 2010

(51) Int. Cl.
*G06T 15/00*    (2011.01)
*G06T 17/00*    (2006.01)
*G06K 9/00*    (2006.01)

(52) U.S. Cl. .......................... 345/420; 345/419; 382/154
(58) Field of Classification Search .......... 345/419–427, 345/619–627, 632, 633
See application file for complete search history.

(56) References Cited

U.S. PATENT DOCUMENTS

| 6,765,569 B2 * | 7/2004 | Neumann et al. ............ 345/419 |
| 2009/0128553 A1 * | 5/2009 | Perry et al. .................... 345/419 |

OTHER PUBLICATIONS

Partick Sinclair, "ARToolKit", 2001; http://www.metade.org/research/phd/artoolkit/.*
Rikk Carey, Gavin Bell and Chris Marrin, "VRML97 ISO/IEC 14772-1:1997", 1997, The VRML Consortium Incorporated.*
Yaqin Tao, Huosheng Hu, Huiyu Zhou, "Integration of Vision and Inertial Sensors for Home-based Rehabilitation", InerVis 2005, the 2nd Workshop on Integration of Vision and Inertial Sensors, Apr. 18, 2005, p. 1-6.*
Kevin T.W. Tan, Emma M. Lewis, Nick J. Avis, Philip J. Withers, "Using Augmented Reality to Promote an Understanding of Materials Science to School Children", SIGGRAPH Asia 2008, Singapore, Dec. 10-13, 2008, p. 1-8.*
Brad Farris and Khaled El-Sawi, "Physics-based Robotic Simulation using Joint Constraints", In Proc. of the 13th Annual Conference on Industry and Management Systems, Cocoa Beach, Fl., Mar. 12-14, 2007, p. 1-5.*
Artoolkit, downloaded Oct. 19, 2009, 1 pg., http://www.hitl.washington.edu/artoolkit.
Cosmas, J., et al., "3D Murale: A Multimedia System for Archaeology", Proceedings of VAST 2001.
Girgensohn, A., et al., "DOTS: Support for Effective Video Surveillance", ACM Multimedia 2007, pp. 423-432.
Guo, F., et al., "Featured Wand for 3D Interaction", ICME 2007, pp. 2230-2233.
Lourakis, M. et al., "A Generic Sparse Bundle Adjustment c/c++ Package Based on the Levenberg-Marquardt Algorithm", http://www.ics.forth.gr/~lourakis/sba, downloaded Oct. 27, 2009, 3 pgs.

(Continued)

*Primary Examiner* — Kee M Tung
*Assistant Examiner* — Sing-Wai Wu
(74) *Attorney, Agent, or Firm* — Morgan, Lewis & Bockius LLP

(57) ABSTRACT

A method and system for defining a model by analyzing images of a physical space. In some embodiments the images of a physical space contain distinctive visual features with associated semantic information, and the model is defined using image feature detection techniques to identify distinctive visual features and a rich marker-based markup language to give meaning to the distinctive visual features. In some embodiments the distinctive visual features are predefined markers, and the markup language specifies model aspects and rules for combining semantic information from a plurality of markers to define the model.

29 Claims, 17 Drawing Sheets

OTHER PUBLICATIONS

Kimber, D., et al., "Marking up a World: Visual Markup for Creating and Manipulating Virtual Models", Immerscom09, 7 pgs., 2009.

NewtonDynamics, "Newton Game Dynamics:Physics Engine," downloaded Oct. 19, 2009, 3 pgs., http://www.newtonsdynamics.com/forum/newton.php.

SketchPhysics, downloaded Oct. 19, 2009, 1 pg., http://code.google.com/p/sketchyphysics.

Smith, R., "Open Dynamics Engine," 2000-2006, 1 pg., http://www.ode.org/.

Rekimoto, J. et al., "CyberCode: Designing Augmented Reality Environments with Visual Tags", Proceedings of DARE, Designing Augmented Reality Environment, 2000, pp. 1-10.

Rieffel, E.G. et al., "Geometric Tools for Multicamera Surveillance Systems", ICDSC 2007, pp. 132-139.

Rohs, M. et al., "Using Camera-Equipped Mobile Phones for Interacting with Real-World Objects", Advances in Pervasive Computing, 2004, pp. 265-271.

* cited by examiner

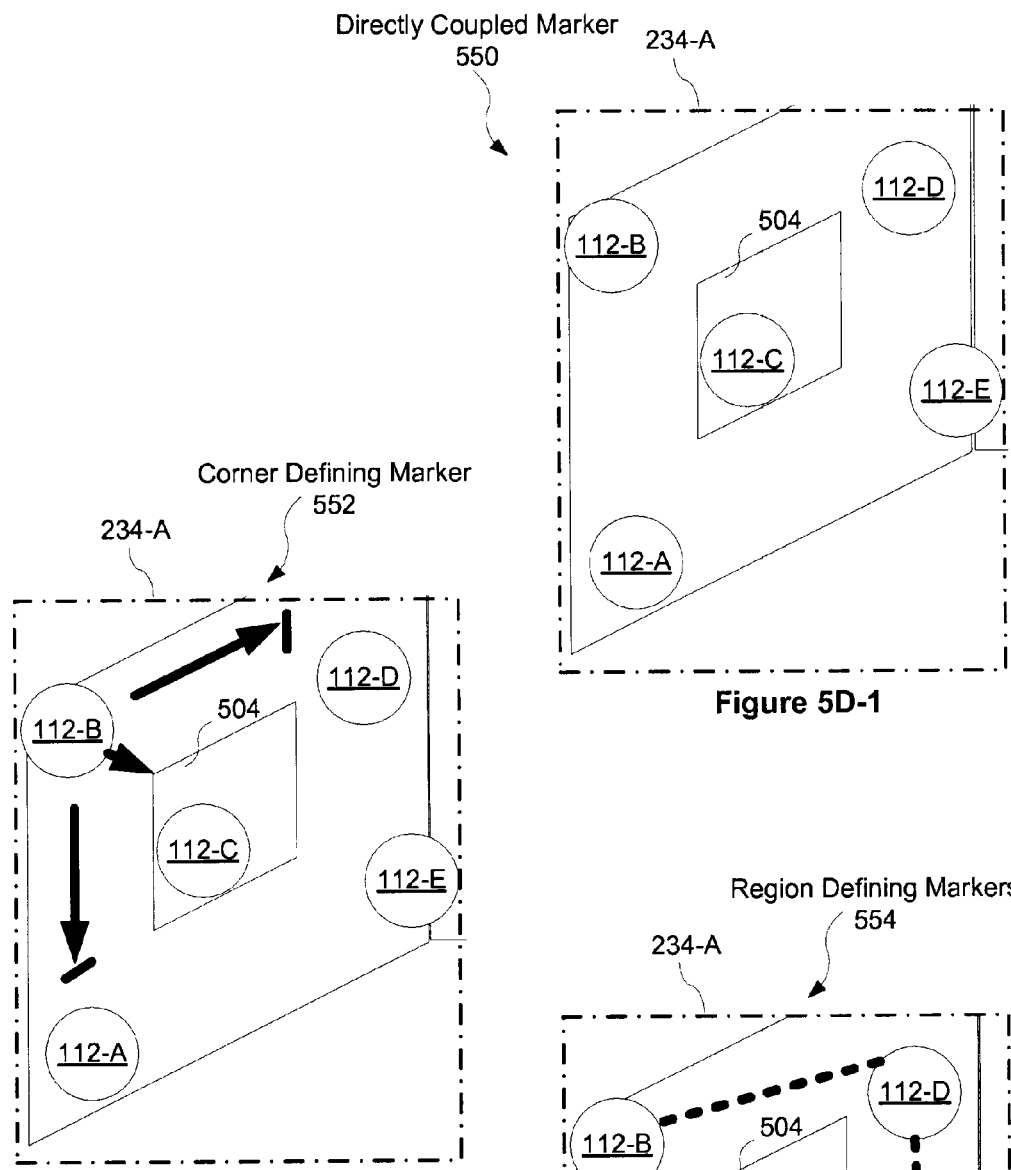
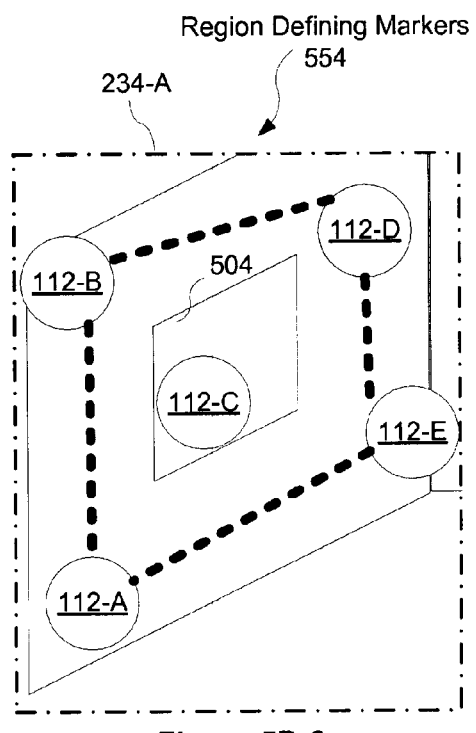
Figure 5D-1
Figure 5D-2
Figure 5D-3

MODEL CREATION USING VISUAL MARKUP LANGUAGES

TECHNICAL FIELD

The disclosed embodiments relate generally to the definition of a three dimensional model, and more particularly, to automatically defining a model using a markup language employing predefined visual markers that are visible in images of a physical space.

BACKGROUND

An increasing number of applications make use of virtual representations of physical spaces. However, the creation of such virtual models is expensive and time consuming, involving direct measurement of individual aspects of the physical space, photography and sophisticated graphical tools. In some instances, artists are hired to create three dimensional models of physical spaces from images of the spaces using interactive modeling tools. In other instances, specialized imaging equipment is required to capture the physical parameters of a physical space which can then be used to define the aspects of a model. These techniques require a substantial investment in the time of specialized experts and/or specialized hardware. This is unfortunate, because it makes creating three dimensional models of a physical space too costly for many applications.

Thus, there is a need for a method of defining a model based on images of a physical space that is relatively quick and inexpensive, so that virtual representations of physical spaces can be constructed more easily and used in a wide variety of applications where they were not previously practical due to the time and/or cost associated with producing such models.

SUMMARY

The above deficiencies and other problems associated with defining a model based on images of a physical space are reduced or eliminated by the disclosed system and method for defining a model by analyzing one or more images of a physical space that include a plurality of distinctive visual features, at least one of the visual features being a predefined marker having associated semantic information. In some embodiments the associated semantic information is defined in accordance with a markup language that specifies model aspects and rules for combining semantic information from a plurality of markers, and the model is defined based at least in part on the associated semantic information.

An additional benefit of some embodiments described herein is that a model with dynamic elements may be defined from static images of a physical space. In some embodiments, a model is defined by analyzing a plurality of images of a space in a static configuration, at least one of the images including one or more distinctive visual features. In some embodiments the distinctive visual feature is associated with semantic information; and the model is defined in accordance with the associated semantic information. In some embodiments the model includes at least one model aspect associated with one or more of the distinctive visual features, wherein the model aspect is capable of dynamic behavior in accordance with the semantic information associated with one or more of the distinctive visual features.

BRIEF DESCRIPTION OF THE DRAWINGS

FIGS. 5C-1, 5C-2 and 5C-3 are a block diagrams illustrating images of a physical space in accordance with some embodiments.

FIGS. 5D-1, 5D-2 and 5D-3 are a block diagrams illustrating different methods of associating markers with physical elements in a physical space in accordance with some embodiments.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known method, procedures, components, circuits and networks have not been described in detail so as not to unnecessarily obscure aspects of the embodiments.

Embodiments of a method, system and computer program product for defining a model are now described. In some embodiments aspects of the model may be determined in accordance with physical aspects of a physical space. In some embodiments at least one of the aspects of the model is determined in accordance with a predefined marker placed by a user that does not correspond to an aspect of the physical space. In some embodiments these aspects are defined using one or more predefined markers with associated semantic information that are visible in a sequence of images. An aspect of a model may be any value, measure, parameter, relationship, constraint, object within the model or characteristic of an object within the model that is indicative of information that is useful for constructing the model. For example one aspect may indicate that a set of features lies on the same planar surface. Other aspects may indicate a three dimensional parametric shape such as a cylinder, or a set of markers indicating a two dimensional parametric shape and an extrusion marker to indicate the extrusion of the two dimensional parametric shape into a third dimension. Aspects may also include a pointer that indicates an insertable item is to be inserted at a particular location, or an indication that an object should be placed in the model or that the object should be a particular color. In some embodiments it is possible for one or more aspects of a model created using this method to be different from or contradictory to one or more aspects of the physical space.

Figure 1A:
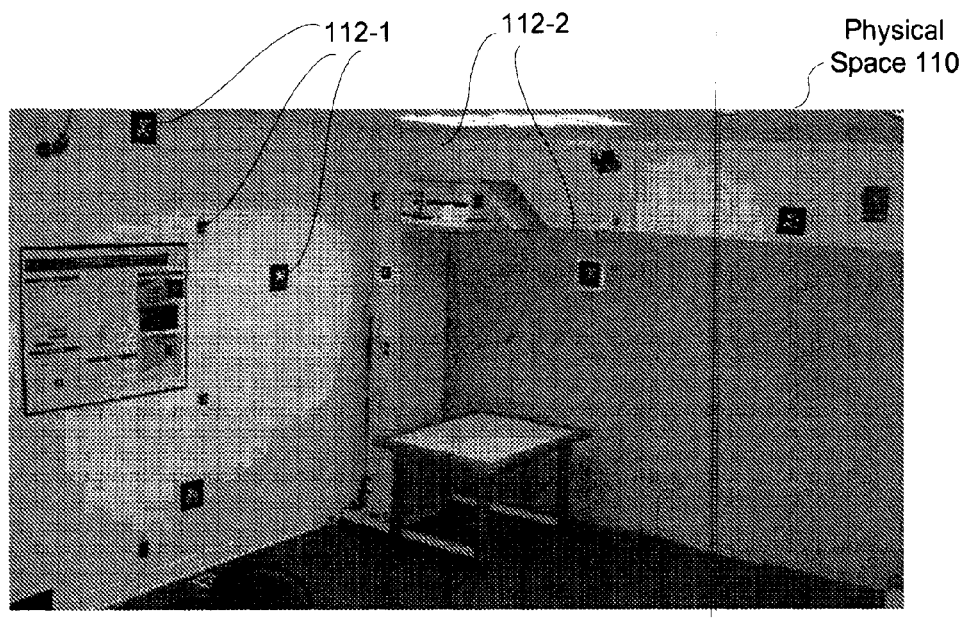
FIGS. 1A and 1B illustrates a physical space and a model that is representative of at least some aspects of the physical space in accordance with some embodiments.

Attention is now directed towards embodiments of the method. FIG. 1A is a diagram illustrating an image of a physical space 110. The physical space 110 contains a number of distinctive visual features 112. In some embodiments distinctive visual features include one or more features that are predefined markers 112-1, and may also include one or more features that are not predefined markers 112-2. In some embodiments one or more predefined markers 112-1 are placed around the physical space 110 by a user. Considerations for placing the markers include identifying key elements of the physical space such as walls and floors, identifying physical objects in the room, such as tables and chairs. More predefined markers 112-1 may be placed in a region of the physical space that is of particular interest to the user, while fewer predefined markers 112-1 may be placed in regions of the physical space that are not of particular interest to the user. In addition, some predefined markers 112-1 may not correspond to any particular object in the physical space. In some embodiments markers may be placed in the physical space to indicate the location of a desired element in the model which is not present in the physical space or is present in a different location in the physical space. For example, a predefined marker 112-1 could be located in the middle of a physical space and could indicate that a wall is to be placed in the model with a pose relative to the pose of the predefined marker. In the resulting model, in this example would have a wall placed in the middle of the model.

In some embodiments a predefined marker 112-1 may be a two dimensional image that is reproduced on a repositionable object. One example of a predefined marker 112-1 is a black and white pattern reproduced on a sheet of paper. A predefined marker 112-1 may also contain an element that allows a user to permanently or semi-permanently attach the predefined marker 112-1 to a physical object in a physical space. For example, a predefined marker including a black and white pattern reproduced on a sheet of paper may also have an adhesive backing. Alternatively a predefined marker 112-1 may have a mounting point for hanging the predefined marker on a hook or other mount in the physical space. In some embodiments the predefined marker 112-1 may be semi-permanently associated with a physical object in the physical space using an attachment means that is not a part of the predefined marker 112-1; for example a marker may be attached to a physical object using tape, glue, staples or other attachment means. Distinctive visual features that are not predefined markers 112-2 may be features in the physical space 110 that are capable of detection by image processing techniques. In some embodiments features that are capable of detection by image processing techniques may include features that are uniquely identifiable when viewed from a variety of angles and a wide variety of locations in the physical space 110 and may also be uniquely identifiable in a variety of lighting conditions. For example, such visual features could include, without limitation: detected edges of physical objects, corners of physical objects, rectangles in images, and other physical features capable of detection using scale invariant feature transforms. Additionally, in some embodiments for updating the model, semantic meanings associated with predefined markers can be associated with nearby visually distinctive features (e.g., identifiable corners, edges, wall cracks, or spots) that are not predefined markers so that the semantic meanings persist in images that are subsequently captured even if the predefined markers have been removed. In this embodiment, the information provided by a marker can continue to aid in updating a model even after the markers are taken down.

Figure 1B:
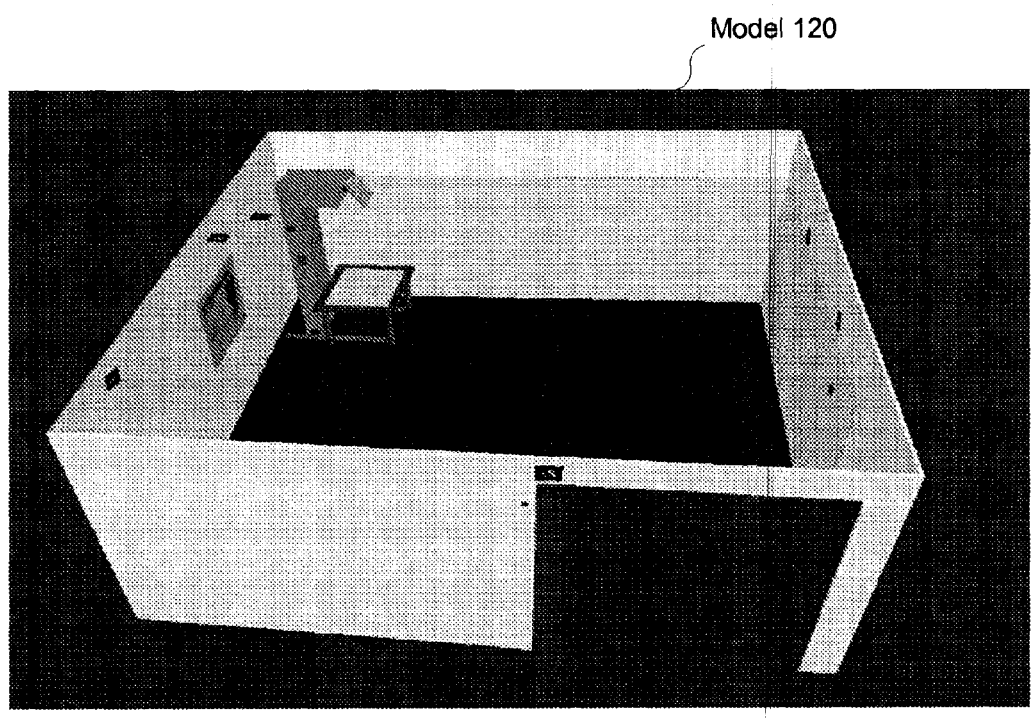

FIG. 1B is a diagram illustrating a model 120 that is representative of the physical space 110 (FIG. 1A). As described in more detail below with reference to FIGS. 5A-5C a sequence of one or more images of physical space 110 is collected by or at the direction of a user. And these images are then used to define a model 120 as discussed in greater detail with reference to FIGS. 4A-4C below. In some embodiments the model is determined by a computing device running software stored on a computer readable storage medium that embodies at least one of the methods described herein, an exemplary computing device is described in more detail below with respect to FIG. 2. A computing device may be any device capable of performing computations based on instructions stored in a computer readable storage medium, for example a computing device may be a workstation system, a personal computer, a personal digital assistant, a cell phone, or any other stationary or mobile computer.

Figure 2:
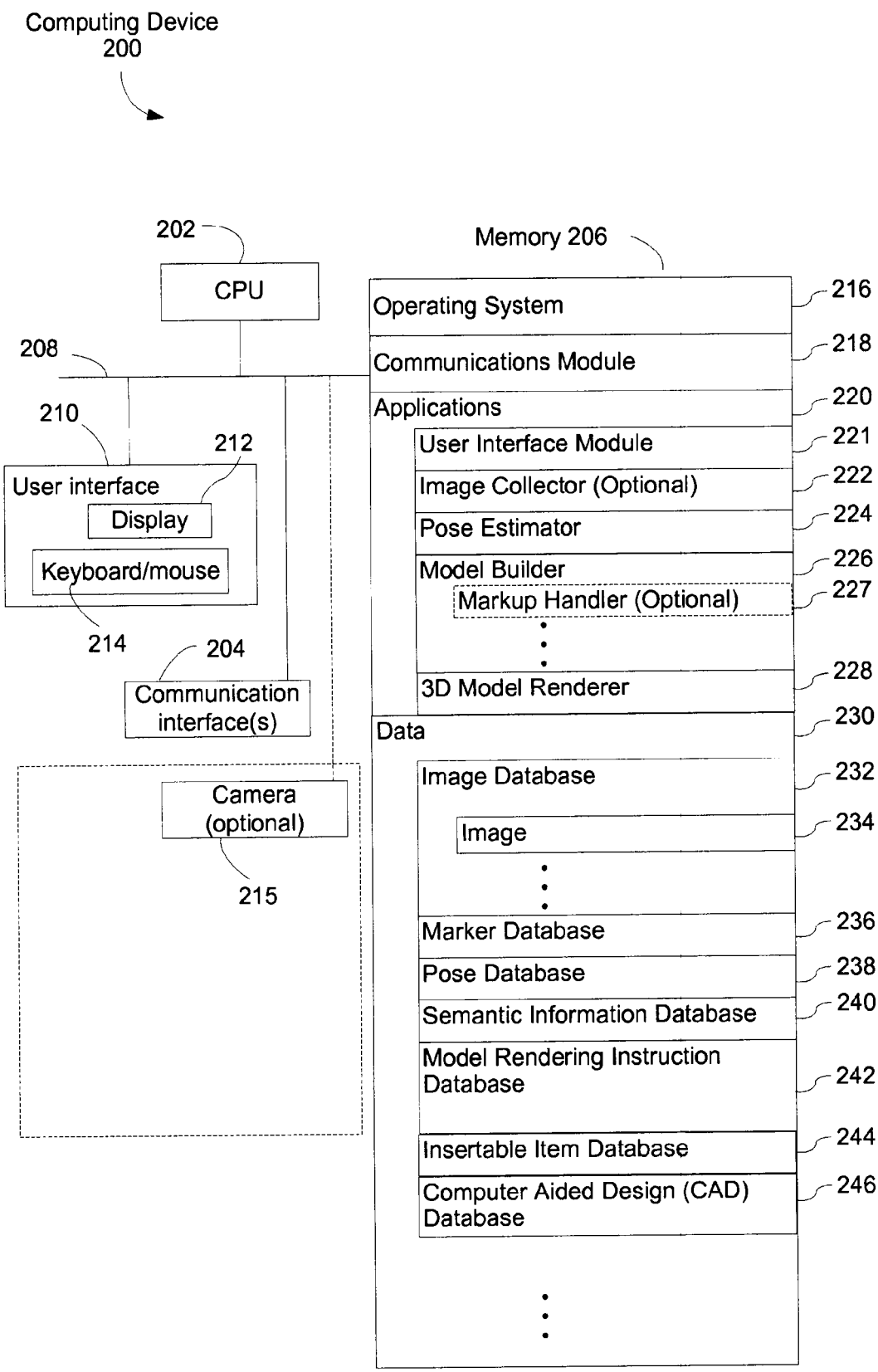
FIG. 2 is a block diagram illustrating a computing device in accordance with some embodiments.

FIG. 2 shows an embodiment of a computing device 200 that implements the methods described above and includes one or more processing units (CPU's) 202, one or more network or other communications interfaces 204, memory 206, and one or more communication buses 208 for interconnecting these components. The communication buses 208 may include circuitry (sometimes called a chipset) that interconnects and controls communications between system components. The computing device 200 may optionally include a user interface 210. In some embodiments, the user interface 210 includes a display device 212 and/or a keyboard 214, but other configurations of user interface devices may be used as well. The computing device 200 may optionally be used with or include one or more cameras 215. A camera 215 may include one or more sensors configured to capture images and optionally may also include other sensors configured to capture other information such as the orientation or location of the camera 215. A camera 215 may communicate with the computing device 200 while images are being captured by the camera 215 or after one or more images have been captured by the camera 215. Alternatively the camera 215 may be independent from the computing device 200 and images may be transferred from the camera 215 to the computing device 200 by the user via a wired or wireless interface. Memory 206 may include high speed random access memory and may also include non-volatile memory, such as one or more magnetic or optical storage disks, flash memory devices, or other non-volatile solid state storage devices. The high speed random access memory may include memory devices such as DRAM, SRAM, DDR RAM or other random access solid state memory devices. Memory 206 may optionally include mass storage that is remotely located from CPU's 202. Memory 206, or alternately the non-volatile memory device(s) within memory 206, includes a computer readable storage medium. Memory 206 stores the following elements, or a subset of these elements, and may also include additional elements:

- an operating system 216 that includes procedures for handling various basic system services and for performing hardware dependent tasks;
- a network communication module (or instructions) 218 that is used for connecting the computing device 200 to other computers via the one or more communications network interfaces 204 and one or more communications networks, such as the Internet, other wide area networks, local area networks, metropolitan area networks, and so on;
- applications 220, which may include: a user interface module 221, an image collector application 222, a pose estimator application 224, model builder application 226 optionally including one or more markup handlers 227, a three dimensional (3D) model renderer application 228; and
- data 230, which may include:
  - an image database 232 which, in some embodiments, may include one or more images 234 and other information such as a unique identifier associated with one or more of the images, metadata about an image that was automatically stored by a camera when the image was captured, or metadata about the image that was manually entered by a user or deduced by the system;
  - a marker database 236 which, in some embodiments, may include marker information such as data representative of the distinctive visual appearance one or more markers, a size of one or more markers, a unique identifier associated with one or more markers, or association data indicative of an association between a plurality of markers;
  - a pose database 238 which, in some embodiments, may include pose information about one or more markers, pose information about one or more images, a unique identifier of one or more features, a unique identifier of one or more images, data representative of the distinctive visual appearance one or more markers, or data representative of one or more images;
  - a semantic information database 240 which, in some embodiments, may include a unique identifier of one or more features, semantic information associated with one or more of the features (as described in more detail below with reference to FIG. 6);
  - a model rendering instruction database 242 which, in some embodiments, may include aspects of the model such as static parameters and dynamic parameters;
  - an insertable item database 244 which, in some embodiments, may include data representative of insertable items such as an image file, a 3D CAD file, a video file, a link to a video stream, or a placeholder object for an insertable item; and
  - a CAD database 246 containing a library of 3D representations of objects.

Figure 3A:
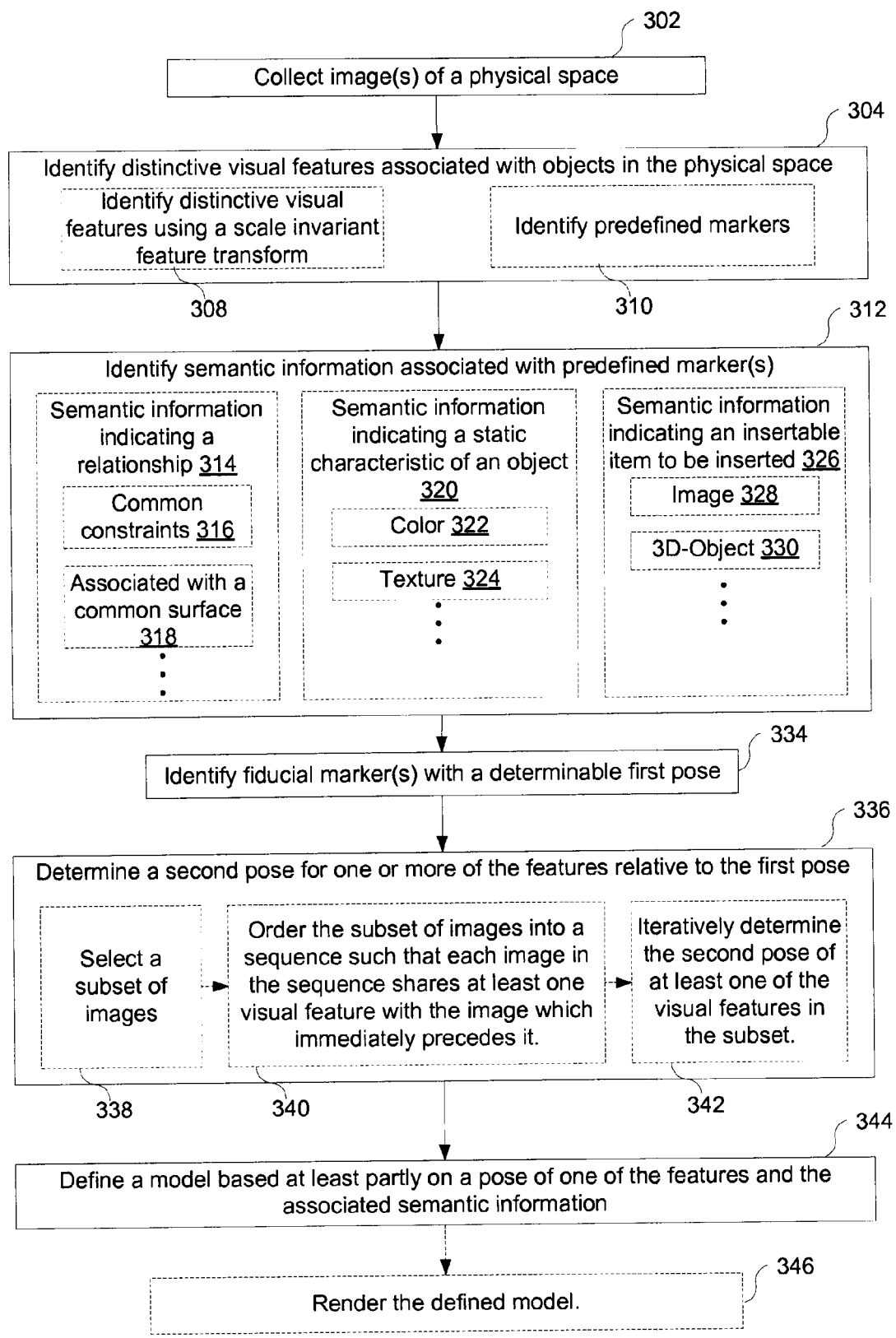
FIG. 3A is a flow chart illustrating a method for defining a model in accordance with some embodiments.

Attention is now directed towards a description of the method according to some embodiments for defining a model 120. FIG. 3A is a flow chart illustrating one embodiment of a method for defining the model 120. One or more images of a physical space are collected (302). In embodiments where the camera 215 is associated with the computing device 200 when the images 234 are captured, collecting images 234 may be done automatically. For example, the images 234 may be captured by a camera 215 that is associated with a computing device 200 and then stored by an image collector application 222 in the image database 232. In an alternative embodiment, the images 234 may be captured by a camera 215 that may or may not be attached to the computing device 200. Manually captured images 234 may then be stored in the image database 232 by or at the direction of a user. A user may also make other modification to the applications 220 or the data 230 stored in the databases through inputs to a user interface module 221. The user interface module 221 may be separate or may be combined with other modules and applications.

It should be understood that images 234 may be stored in an image database 232 with or without metadata. This metadata may include: image capture variables (such as focal length, lens distortion, barrel distortion) as well as other information automatically recorded by the camera 215 or manually input by a user that would allow the image 234 to be more accurately mapped onto the physical space 110. For example, other such metadata could include: time and date information, GPS coordinates of the camera, user labels for an image or set of images (e.g. these images were all taken in room A). In some embodiments, for a subset (or all) of the images, the image capture variables for camera 215 may be held constant, and the camera may be calibrated for that set of image capture variables. In some embodiments a single camera 215 is used to ensure that no variation in image capture variables is introduced that may affect the accuracy of the model definition process. In an alternative embodiment image capture variables are recorded as metadata with the images and computer software is used to compensate for any variation in image capture variables between images 234. Image metadata may also include data that orders at least a subset of the images 234 in the image database 232 into a sequence with connecting information about the images 234. For example, the images 234 may include metadata that specifies a sequence of images with a time interval between each image such that the images 234 could be displayed as a video recording, with each image 234 serving as one frame in the video recording. In some embodiments, these images are recorded as individual images by a still-camera, in other embodiments these images are recorded as video (or a sequence of video frames) by a videocamera.

In some embodiments, at least a subset of the images is analyzed (304) to identify distinctive visual features 112 associated with objects in the physical space 110. These distinctive visual features 112 generally will be robust (i.e., uniquely identifiable) in a wide variety of lighting conditions and for differing locations, orientations and distances of the camera from the distinctive visual features 112. In some embodiments this means that the distinctive visual features 112 generally must exhibit at least some degree of scale invariance (i.e., at least some of the distinctive visual appearance of the feature are recognizable when viewed at different scales), some degree of rotational invariance (i.e., at least some of the distinctive visual appearance of the feature are recognizable when viewed at different angles). In some embodiments the distinctive visual features also exhibit some degree of rotational asymmetry. In some embodiments distinctive visual features 112 are identified using scale invariant feature transforms (308). In some embodiments, predefined markers 112-1 are identified (310). In some embodiments a combination of these techniques may be used. In some embodiments the predefined markers 112-1 may be designed such that they can be easily identified by a computing device 200 as discussed in greater detail below with reference to FIG. 8A. It should be understood that one skilled in the art would recognize that the distinctive visual features described herein could be identified in an image using any combination of these techniques or other techniques known in the art for identifying distinctive visual features.

Semantic Information

As shown in FIG. 3A, in some embodiments semantic information from the semantic information database 240 that is associated with a subset of the predefined markers 112-1 may be identified (312). Semantic information is information that gives a specific meaning to a predefined marker 112-1 or set of markers. This semantic information may be pre-assigned or it may be assigned by the user after the marker has been placed in the physical space (e.g., associated with a physical object in the physical space, associated with a desired location of an object in the model, or located in the model for the purpose of indicating an aspect of the model relating to an environmental characteristic of the model).

In some embodiments, the associated semantic information may indicate a relationship between one or more markers or one or more objects with which a subset of the predefined markers are associated (314) indicating, for example: that all markers in the subset of predefined markers are subject to a set of common constraints (316); that all markers in the subset of predefined markers are associated with a common surface (318); that all markers in the subset of predefined markers have a common orientation; that all markers in the subset are on surfaces of the same color or texture, or that all markers in the subset of predefined markers are associated with a common object. In some embodiments this relationship is indicative of the actual physical relationship between physical objects in the physical space. In other embodiments, this relationship is indicative of a desired relationship in a model that is not indicative of an actual physical relationship between in the physical space. In addition, this relationship may indicate that one object that is not entirely visible in any particular image 234 is, in fact, one continuous object. This relationship may be used to indicate pipes or walls that are partially hidden by objects in a single room. Additionally, this relationship may be used to indicate that two markers are associated with distinct sides of an object within a room where the distinct sides cannot be seen in a single image (for example, a first marker could be associated with a front side of a door while a second marker could be associated with a back side of a door). In some embodiments, this relationship may be used to indicate opposite sides of a wall or floor or ceiling that are shared by two different rooms, or internal and external walls of a building.

This type of semantic information provides a way to define a model that is representative of a physical space that contains a first region and one or more other regions that are visually separated from the first region. For example, the relationship between two adjacent rooms can be specified by semantic information associated with markers in the following way: a first room may have a first marker associated with a first side of a wall, and a second room may have a second marker associated with a second side of a wall; if one of the markers has associated semantic information indicating that the first side of a wall and the second side of a wall are two sides of the same wall, then the model builder 226 can determine that the two rooms are adjacent and build a model where the first side of the wall and the second side of the wall form a common wall. The model builder 226 may also use the size of the first side of the wall to estimate the size of the second side of the wall. This process may also be used to identifying opposite sides of other structures such as a floor and a ceiling that are present in different rooms. Using this technique for a large number of rooms, physical parameters of an entire building, or a region of a building could be determined and used to define some of the parameters of a model. From the foregoing discussion it should be understood that the preceding list is merely exemplary and that there are many kinds of relationships that could be indicated by the associated semantic information, which would be readily apparent to one skilled in the art.

In another embodiment the associated semantic information of a respective predefined marker or set of markers indicates a static characteristic of the respective object with which the predefined marker or markers is associated (320), including, for example: a color of the respective object (322); a texture of the respective object (324); that the respective object is an insertable object (326). In some embodiments the object may be indicative of a physical object in the physical space. In other embodiments the object may be a desired object in the model that is not indicative of a physical object in the physical space, such as when a marker is suspended in the air to represent the location of an associated object in the model. Semantic information indicating a static characteristic of a marker can be associated with a marker in a number of ways: color and/or texture information can be pre-defined, color and/or texture information can also be selected by the user after the marker is placed, by user provided input to the user interface module 221. In addition color and/or texture be sampled from an image 234 in which the marker is visible. Color and/or texture sampling can be performed in a pre-defined region indicated by the marker (e.g., in the area of the marker) or can be sampled from a user-defined region associated with the marker.

As used herein, a color or texture is "sampled" when the semantic information associated with a marker includes information representative of the actual color or texture of the object associated with the marker. The sampled color or texture may then be applied to other regions, as indicated by the marker semantics, which may or may not be the color or texture of any associated regions in the physical space. Sampling a texture from an image of a physical space includes extracting a region of an image (or multiple images). That extracted region of the image(s) may then be inserted into a model at a location determined by the user. For example, if the semantic information indicates that the associated object is a picture or a display, a portion (or all) of the image 234 containing the object may be selected and stored as additional information associated with a marker. In this example, semantic information associated with a marker may indicate that the marker is associated with a particular region containing a rectangular image on the wall (for example a painting or poster), and that the rectangular image is to be sampled. Image processing software may then be used to identify the largest rectangle in the region associated with the marker, and then store a new image of the contents of that rectangle in an insertable item database 244 and place an reference to that item in the semantic information database 240 as semantic information associated with the marker. In some embodiments the 3D model renderer 228 may use that associated information to place the rectangular image (for example a painting or poster) in the model 120 in one or more places. In other embodiments, if the semantic information indicates that the associated object in the model is a picture or a display, the region containing the picture or display may be indicated in the model, so that an object or data stream can be chosen by a user to appear in that location.

Sampling a color from an image of a physical space may include: determining a color value at a particular location in the image indicated by the marker, determining an average color value for the image or portion of the image. The sampled color may then be applied to one or more aspects of the model. For example, a user may want to sample the color of a wall. In this example the user could place a marker on the wall indicating a specific location on the wall to sample. Alternatively, the user could indicate a region on the wall to sample, and the color value of that region could be averaged (e.g. a user could capture a close up image of a region of the wall containing the color to be sampled). Additional marker(s) could indicate that the sampled color was to be applied to other components of the model, such as other walls in the model. From the foregoing discussion it should be understood that the preceding list is merely exemplary and that there are many different aspects of the model that could be indicated by the associated semantic information, which would be readily apparent to one skilled in the art.

In another embodiment, the associated semantic information of a respective predefined marker or set of markers indicates that an insertable item from an insertable item database 244 is to be inserted at a position relative to the location of the predefined marker or markers (326). The insertable item may be a data file or other representation of an object capable of being stored in memory 206, such as a digital photograph or other digital image (328) (as discussed in the previous paragraph); a representation of a three-dimensional object, such as an object created by computer aided design (330); a video recording; or a video stream such as a webcam or other live video feed. From the foregoing discussion it should be understood that the preceding list is merely exemplary and that there are many kinds of insertable items that could be indicated by the associated semantic information, which would be readily apparent to one skilled in the art.

In yet another embodiment, the associated semantic information of a respective predefined marker indicates that it will help define a submodel. A submodel may be determined from all of the markers associated with that submodel. The submodel may or may not have an analog in the physical space. The submodel can be stored in a database of insertable objects. Storing the submodel in a database can have many advantages. For example, a physical object (e.g., a table in a classroom) may be representative of a number of distinct, similarly shaped physical objects. In some embodiments, a user may want to use visual features, including one or more predefined markers, to define a submodel of one of the similarly shaped physical objects. Other insertion markers may also be placed by a user to indicate that the defined submodel of the object is to be inserted at one or more locations in the model. In some embodiments these insertion markers indicate actual physical objects that are present in the physical space. In other embodiments these insertion markers may indicate desired objects in the model that do not correspond to actual physical objects in the physical space.

For instance, in the example of a classroom with a number of similar or identical tables, a number of markers in a group of markers may be associated with one of the tables so that the table can be modeled in detail. A reference marker for the group of markers may indicate the frame of reference for the model of the table and its definition. If other tables are present in the room, a single insertion marker, placed in the same relative location and orientation on each of the other tables in the room, is sufficient to indicate that a model of the stored table should be inserted in each of these locations. If other tables are not present in the room, a single insertion marker is sufficient to indicate that a model of the stored table should be inserted at that location. Using associated semantic information in this way improves the efficiency and speed of defining a model, because it reduces the amount of work necessary to define the aspects of multiple similar or identical physical objects. From the foregoing discussion it should be understood that the preceding list is merely exemplary and that there are many meanings that could be indicated by the associated semantic information, which would be readily apparent to one skilled in the art. It should also be understood that a user could associate semantic information with a distinctive visual feature that is not a predefined marker.

Pose Determination

Attention is now directed toward determining the pose of the distinctive visual features 112 in the images 234. The pose of a distinctive visual feature 112 includes the location and orientation of that feature. In the Cartesian coordinate system, the pose of a distinctive visual feature is defined by the position of the feature (e.g., its location along the x-axis, y-axis and z-axis) as well as the orientation of the feature (e.g., its rotation around the x-axis, y-axis and z-axis). It should be understood that the use of the Cartesian coordinate system in this example is merely for convenience; one having ordinary skill in the art would readily understand that any coordinate system that is convenient to the user could be used in its place to uniquely identify the pose of a distinctive visual feature in a physical space 110.

Initially, at least one distinctive visual feature 112 is identified as a fiducial feature. In some circumstances it is desirable to know the actual pose of physical objects in a physical space 110 relative to a fixed coordinate system. In these circumstances a user may determine the pose of the fiducial feature relative to the fixed coordinate system. In some embodiments the fiducial feature has a determinable first pose (334) with respect to a fixed coordinate system. In some embodiments a fiducial feature is identified and then the pose of the fiducial feature is determined by taking physical measurements of the fiducial feature. In other embodiments the desired pose for a fiducial feature is determined and then the fiducial feature is placed in the desired pose. This embodiment may be particularly useful when the location of one or more physical objects outside of the physical space is relevant, for example, when creating a model 120 that may be used as a blueprint for determining the positioning of an appliance over a water pipe that is below (i.e., outside of) the physical space.

The process for determining an image pose based on a feature pose and determining a feature pose based on an image pose is well known in the art using techniques such as photogrammetry. In some embodiments image processing software such as ARToolKitPlus (ARToolKit is a software library that can be used to calculate camera position and orientation relative to distinctive visual features in real time, ARToolKitPlus is an extended version of ARToolKit's vision code) can be used to determine an image pose based on an image 234 containing one or more distinctive visual features 112 with a known pose. Additionally, in some embodiments the same image processing software may be used to determine the feature pose of identified distinctive visual features 112 in an image 234 based on a known pose of the image. As these techniques are well known in the art, they will not be discussed further here In some embodiments the pose of the fiducial feature is not determined relative to a fixed coordinate system, but the pose of other features are determined relative to the pose of the fiducial feature. This is appropriate in situations where there is no need to know the actual pose of the distinctive visual features in a physical space 110 relative to a fixed coordinate system, and it is sufficient to simply know the pose of distinctive visual features in a physical space 110 relative to the other objects in the physical space 110. In these circumstances it may be faster not to take actual measurements of the pose of the fiducial feature. In some embodiments where the actual pose of the fiducial feature has not been determined, a coordinate system can be defined relative to the pose of the fiducial feature. For example, for a substantially planar rectangular fiducial feature, a coordinate system can be uniquely defined by defining a corner of the fiducial feature as the origin of the coordinate system, a first edge adjacent to the corner of the fiducial feature as parallel to the x-axis, a second edge adjacent to the corner of the fiducial feature as parallel to the y-axis, and a face of the fiducial feature as perpendicular to the z-axis. This embodiment may be particularly useful when only the relative pose of visual features is required, because the user can determine the relative pose of the visual features and define a model without taking the time to measure the pose of any of the markers.

In some embodiments the fiducial feature is identified by a user. In other embodiments the fiducial feature is identified automatically by the pose estimator 224 (FIG. 2). In some embodiments a first distinctive visual feature may be automatically identified as the fiducial feature based on the order in which the visual features are detected (e.g. the first visual feature detected may be taken to be the fiducial feature), on the number of other distinctive visual features that are present in an image that contains the first distinctive visual feature, or based on the number of other distinctive visual features that are part of a co-visibility graph with the first distinctive visual feature, as described in greater detail below with reference to FIGS. 5C-1, 5C-2, and 5C-3. Once the fiducial feature has been identified, a second pose for one or more of the distinctive visual features is determined relative to the first pose (336). In some embodiments the second pose for a distinctive visual feature is determined by: selecting a subset of one or more images (338); ordering the subset of one or more of the images in a sequence such that each respective image in the sequence shares at least one visual feature with a respective image that immediately precedes it in the sequence, if any and at least one image in the sequence contains the fiducial feature (340); and iteratively determining the respective second pose of at least one of the visual features in the subset of images based on the first pose (342). This process of determining the respective second poses of the distinctive visual features is described in more detail below with reference to FIGS. 4B and 5A-5D.

In some embodiments, at least some aspects of the model are specified based at least partly on a pose of a respective feature and the associated semantic information (344). The process of defining a model based at least in part on the aspects of the model is described in more detail below with reference to FIGS. 5A-5D. In some embodiments the defined model is rendered (346) in accordance with the poses of the identified distinctive visual features and the semantic information associated with the distinctive visual features. The process of rendering a model is described in more detail below with reference to FIGS. 4A-4C.

Figure 3B:
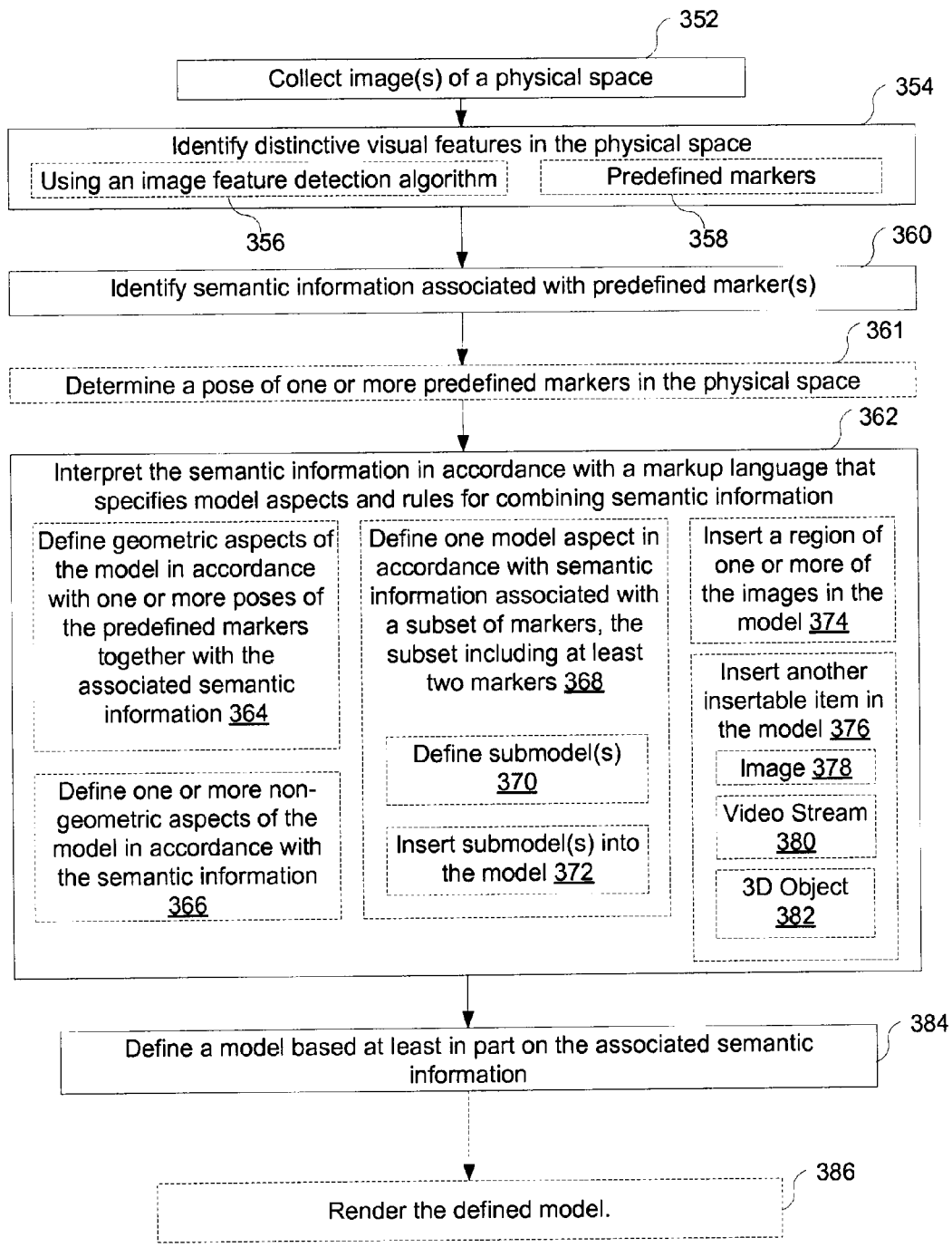
FIG. 3B is a flow chart illustrating a method for defining a model in accordance with some embodiments.

An alternate embodiment of the method for defining a model is described with reference to FIG. 3B. In this embodiment, images are collected of a physical space (352). These images are analyzed to identify distinctive visual features in the physical space (354), at least one of the visual features being a predefined marker having associated semantic information. In some embodiments the distinctive visual features are features that are identified using an image feature detection algorithm (356). In some embodiments the distinctive visual features are predefined markers (358). In some embodiments at least a subset of the predefined markers have associated semantic information, and that information is identified (360) and interpreted in accordance with a markup language that specifies model aspects and rules for combining semantic information from a plurality of markers (362). The markup language is described in greater detail below with reference to FIG. 4C. Model aspects may include elements of the model such as: a model component (e.g., door), a pose of a model component (e.g., the location and orientation of the door), or a description of the visual appearance of a model component (e.g., the color of the door).

Interpreting the semantic information in accordance with the markup language may include determining a pose of one or more predefined markers in the physical space, and defining geometric properties of the model in accordance with one or more poses of the predefined markers together with the associated semantic information (364). In some embodiments interpreting the semantic information may include the use of semantic information associated with one or more markers to define non-geometric aspects of the model (366). These non-geometric aspects of the model may include positioning of lighting in the model, and types of virtual lighting in the model, pre-defined model viewpoints and other non-geometric aspects. In some embodiments at least one of the model aspects is specified in accordance with semantic information associated with a subset of the markers, the subset including at least two markers (368), thus for certain kinds of semantic information at least two markers would be required specify a model aspect (e.g., the length between two markers, or an element that is identified by placing one marker on each corner). In some embodiments these subsets of markers could be used to define a submodel (370) or to insert a submodel into the model (372). In some embodiments multiple insertion markers may be used to insert a single submodel. In other embodiments a single insertion marker may be used to insert a single submodel in a location into the model with a pose in the model that is determined relative to a pose in the physical space of the respective insertion marker. Multiple copies of a submodel may be inserted into a model by simply placing multiple insertion markers in the physical space, where each of the insertion markers refers to the same submodel.

In some embodiments the semantic information associated with a subset of the markers is indicative of regions of the one or more images that will be included in the model (374). The regions of the one or more images may include: a portion of an image in the model, a portion of an image created from multiple images, a portion of an image from a database, found by a matching algorithm, and other image regions. Additionally, the semantic information associated with one or more predefined markers may indicate that an insertable item is to be inserted in the model at a position indicated by the location and orientation of the one or more predefined markers (376). In some embodiments, the insertable item is an image (378), a video stream (380) or a representation of a three dimensional object (382). In some embodiments a model is defined based at least in par on the associated semantic information (384). This defined model may then be rendered (386) by a 3D model renderer, as described in greater detail below with reference to FIGS. 4A-4C.

Figure 4A:
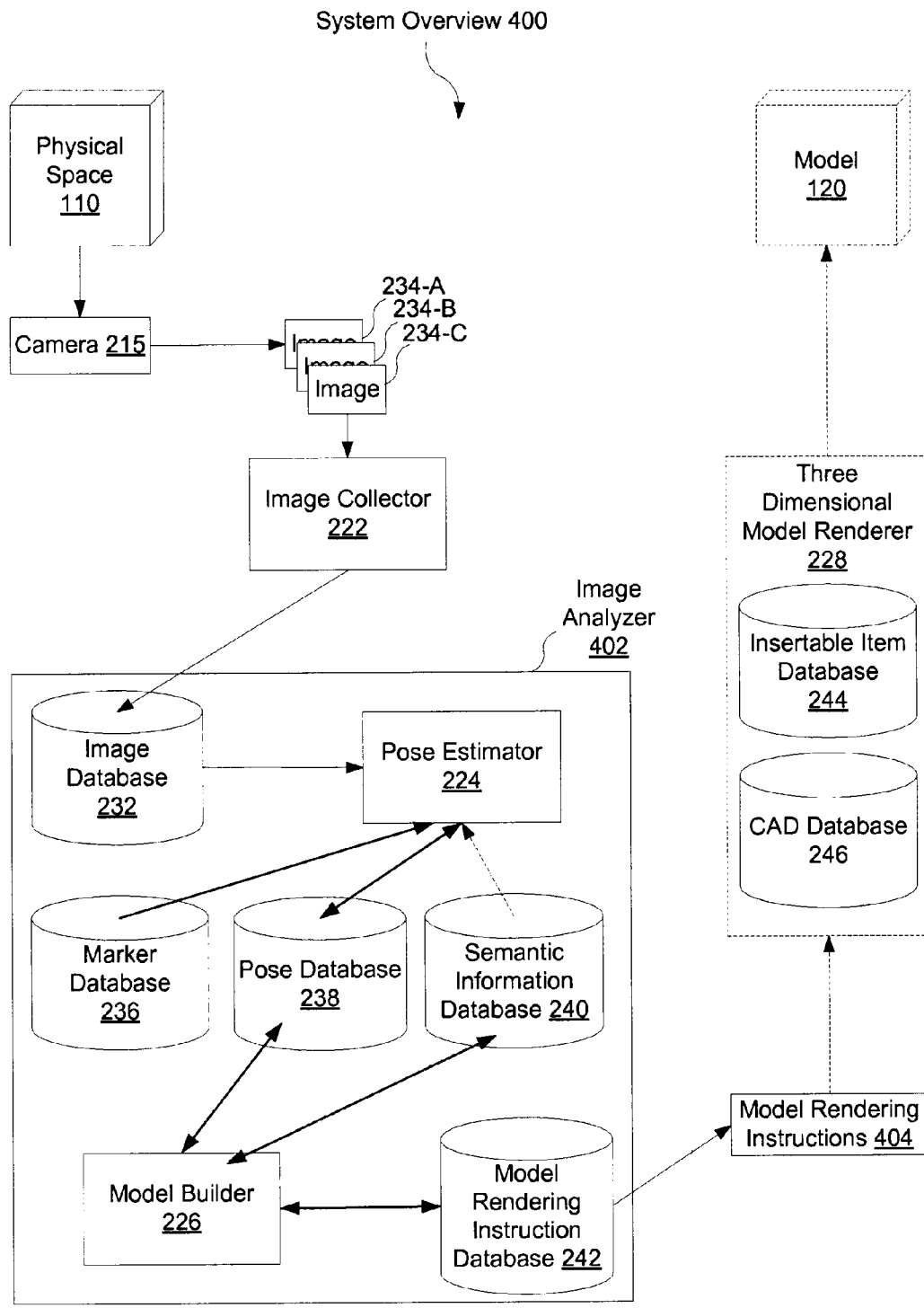
FIG. 4A is a block diagram illustrating a system for defining a model in accordance with some embodiments.

Attention is now directed towards FIG. 4A. FIG. 4A is a block diagram illustrating one embodiment of a system for implementing the method described above. A camera 215 may be used to capture images 234 of a physical space 110. The images 234 of the physical space may also contain (or be associated with) metadata indicating information about the images 234 as discussed above with respect to FIG. 2. In some embodiments the images are collected by an image collector 222 and stored in an image database 232. In other embodiments, images are stored in the image database 232 by or at the user's direction.

Once one or more images 234 have been stored in the image database 232, in some embodiments a pose estimator 224 estimates the poses of at least a subset of the distinctive visual features 112 in the images 234 stored in the image database 232 in accordance with the method described with reference to FIG. 3A. In some embodiments a model builder 226 defines a model in accordance with a markup language (as discussed in greater detail below with reference to FIG. 4C) that specifies model aspects and rules for combining semantic information from a plurality of markers. The model builder 226 then defines a model and determines model rendering instructions 404 for rendering a virtual model in accordance with the defined model In some embodiments the model builder 226 uses image pose and feature pose information from the pose database 238 and semantic information from the semantic information database 240 to build a model 120. The model rendering instructions 404 determined by the model builder may then be stored in the model rendering instruction database 242.

In some embodiments an image analyzer 402 provides a user with model rendering instructions 404 which may be used by any compatible three dimensional model renderer to render a three dimensional virtual model in accordance with the defined model. In other embodiments an image analyzer 402 automatically provides the model rendering instructions 404 of the defined model to an integrated 3D model renderer 228 (FIG. 4A). The 3D model renderer 228 may use the model rendering instructions 404, and items from an insertable item database 224 (FIG. 4A) to render a model. The model rendering instructions 404 may provide instructions to the 3D model renderer 228 as to the dimensions and orientation of the defined model; the location, orientation and size of objects or structures within the model; the color, texture and other static characteristics of objects in the model; as well as to indicate insertable items from the insertable item database 244 (FIG. 4A) to insert into the model.] In some embodiments the 3D model renderer 228 automatically builds a model and presents the model to the user. In other embodiments, the user may intervene in the process of building a model in order to provide additional input to the 3D model renderer 228 as the 3D model renderer 228 is building the model, including indicating that one or more images should be ignored or indicating that the pose of one or more markers may be poorly estimated. User input may be provided to the user interface module 221 (FIG. 2) by a user interface. In some embodiments user input may be provided to the model builder 226 in addition to or instead of user input being provided to the 3D renderer 228. Allowing a user to provide input as the model is being built and/or rendered takes additional time, but may also improve the quality of the model. In some embodiments the quality of the model indicates its accuracy in representing the physical space. In other embodiments the quality of the model indicates its accuracy with respect to a model imagined by the user. It should be understood that the modules described herein are merely exemplary, and one skilled in the art would readily appreciate that certain modules could be combined with other modules or subdivided in order to achieve the same results.

Figure 4B:
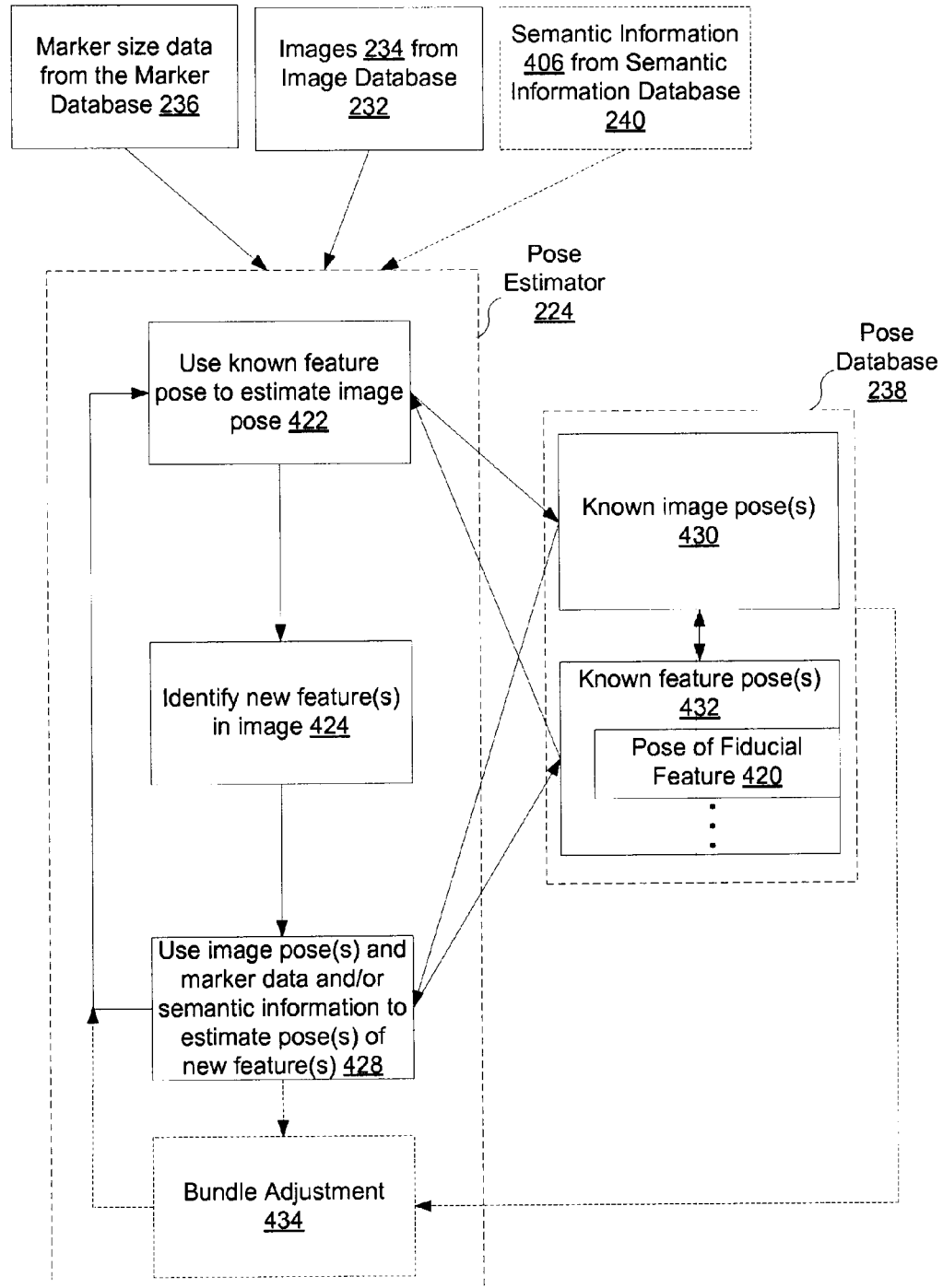
FIG. 4B is a flow chart illustrating a method by which the pose of distinctive visual features in a physical space may be estimated in accordance with some embodiments.

Attention is now directed towards FIG. 4B which illustrates the operation of the pose estimator in accordance with some embodiments. The pose estimator receives: images 234 from image database 232; marker size data indicative of the size of at least a subset of the predefined markers (e.g., 112-1 in FIG. 1A) from the marker database 236; and the pose of at least one fiducial feature (420) or other features 112 with a known or previously determined pose. Then, in accordance with some embodiments, the pose estimator 224 uses the fiducial feature pose to calculate the image pose of an image containing the fiducial feature (422), and stores the image pose in pose database 238. In some embodiments, a software package such as ARToolKit (a software library for building Augmented Reality (AR) applications using computer vision algorithms) or some other well known pose estimation tool is used to calculate the image pose. In some embodiments an image pose is the location and orientation of the camera 215 at the time that the image 234 was captured. The image pose may also include metadata indicative of other aspects of the image 234 such as: focal length, lens distortion, barrel distortion, and other information automatically recorded by the camera 215 or manually input by the user that would allow the image 234 to be more accurately mapped onto the physical space 110. In some embodiments the size and shape of a predefined marker is known and the pose of an image 234 containing the predefined marker can be determined using the known size of the predefined marker and the pose of the marker. In some embodiments the size of a distinctive visual feature that is not a predefined marker can be determined using techniques that are well known in the art. In some embodiments these techniques require two or more images that contain the distinctive visual feature where each of the images has a known pose.

Once an image pose 430 has been calculated, new distinctive visual features are identified (424) in the image, and the feature poses of these features are estimated (428). In some embodiments, a software package such as ARToolKit or some other well known pose estimation tool is used to calculate the pose. Feature poses 432 may be estimated using image poses 430 as well as marker data for predefined markers (such as marker size data) and semantic information (for example, if a marker is located on a common plane with other known markers). Feature poses 432 are then stored in the pose database 238. As additional feature poses 432 become known, these additional known feature poses 432 are used to calculate (422) new image poses 430. In some embodiments this iterative process continues until there are no more image poses or feature poses to determine. In some embodiments this iterative process continues until some predefined number of image poses and feature poses have been determined. In some embodiments this iterative process continues until it is determined that enough feature poses are known so that physical parameters of a physical space can be adequately estimated. The determination of whether enough feature poses are known may be based on whether a model can be constructed that is sufficiently representative of the physical space; this determination can be made by a user or it can be made automatically. In other embodiments the determination of whether enough feature poses are known may be based on whether the model has properties desired by the user, although those properties may not be indicative of the physical parameters of the physical space.

One problem that is recognized in the pose estimation process is that cumulative errors can arise when basing estimations off of previous estimations. It is beneficial to find ways to reduce this cumulative error in measurements. In some embodiments, a bundle adjustment (434) is performed on the set of known poses in the pose database 238 to correct for any cumulative error in the pose estimation process. In some embodiments, a software package such as SBA (a generic sparse bundle adjustment C/C++ package based on the Levenberg-Marquardt algorithm) is used to perform the bundle adjustment, although other bundle adjustment tools could also be used. In other embodiments, cumulative errors in the pose estimation process are reduced by a process of certifying feature poses. In some embodiments feature poses are certified manually by a user providing input to a user input module 221, in other embodiments feature poses are certified automatically. In one example of a certification procedure, in each iteration of the pose estimation process (as illustrated in FIG. 4B), the feature which is visible in the most images with known pose may be bundle adjusted together with all certified features and the images that contain them, and then if the bundle adjustment is successful this feature becomes certified. In particular, a known problem with bundle adjustment is that its numerical optimization can get stuck at local minima. This certification procedure helps to avoid bad bundle adjustment initializations which fail to converge to good solutions.

In one embodiment of a certification procedure a feature pose is only used to estimate the poses of images once it has been certified. In some embodiments in each iteration of the pose estimation process, the feature which is visible in the most images with known pose is bundle adjusted and becomes certified. Additionally, in some embodiments using this procedure only certified features may be used to estimate the pose of images.

Markup Language

In some embodiments, the semantic information associated with markers, such as, for example, those described herein, may be organized to form a rich, marker-based markup language for defining models. This markup language may contain a number of different meanings that can be associated with predefined markers which indicate a set of basic instructions from which a model can be constructed. A single marker can have multiple associated meanings. Some meanings can only be associated with a set of markers, not a single marker. In some embodiments the markup language also contains rules that indicate how markers, with their associated meanings, can be combined to describe elements of the model. In some embodiments these rules may restrict which markers can be combined with other markers or indicate how to resolve conflicts between markers. Some markers may be used independently to indicate one or more desired static aspects of a model. These markers may be combined with other markers to indicate a more complex set of model aspects. In some embodiments two or more markers of the same type must be used to indicate a desired aspect of a model. In other embodiments, markers may indicate instructions for modeling a space that instruct the sampling or definition of an object in a physical space, and may indicate that it is to be inserted in a model at one or more model locations. In some embodiments this markup language has two primary categories of marker meanings, marker meanings for determining static model aspects and marker meanings for determining dynamic model aspects. In some embodiments marker meanings for determining static model aspects may be combined with marker meanings to determine dynamic model aspects.

In some embodiments marker meanings for determining static model aspects may include one or more of the following types:
  Geometric definition for defining:
    Planes: One or more markers are on the same plane. This semantic information may be used for defining a plane as described in greater detail above with respect to FIG. 7.
    Parametric shapes: A set of markers lie on a parameterized shape. This semantic information may be used to deduce the position and parameters of a parameterized shape. The parameterized shapes may be two dimensional shapes lying on a planar surface, or full three dimensional parameterized shapes. For example, a parametric shape could be a circle with a specific radius, and an extrusion marker could be used to define the height of the cylinder. Alternatively the parameterized shape could include the radius of the circle and its height and thus indicate a cylinder.
    Extrusions: One or more markers lie on an extruded surface. When these or other markers also have associated meanings that mean that they lie on a two dimensional parametric shape, this information can be used in defining the model by extruding the shape into three dimensions where the extrusion markers indicate how far the shape should be extruded into the third dimension.
  Extraction/Insertion markers such as:
    Image/Texture/Color extractor: A set of markers that define the area where an image, such as for a picture or bulletin board is located.
    Object insertion: A marker, or set of markers that define the location of an object for which an existing three dimensional model is to be included.
    Definition: A set of markers that indicates the associated objects form a group that may be replicated elsewhere in the model.
  Modifier markers for modifying other defined shapes such as:
    Lines: A set of markers that lie on a line.
    Corners: One or more markers that defines a corner at a particular angle. For example, a single corner marker may indicate a right angle corner. This may provide a convenient way of specifying rectangular regions with few markers.

In some embodiments marker meanings for determining dynamic model aspects may include one or more of the following types:
  Joint constraints, which may include: joint location, joint type, joint axis and joint stops.
  Motion characteristics, which may include: motion type, motion speed and motion direction.
  Material properties, which may include: material type, material density, material friction and material bounce parameters such as coefficient of restitution. Material properties are, in general, any property that could be used by a physics modeler in the creation of a dynamic model.
  Insertion of dynamic elements, which may include: controls (e.g., sliders, switches, levers, handles), motors, conveyor belts, pulleys, springs, wheels, pendulums and articulated joints (e.g. a robotic arm).
  Dynamic aspect of the model environment, which may include: color, texture or lighting.

Figure 4C:
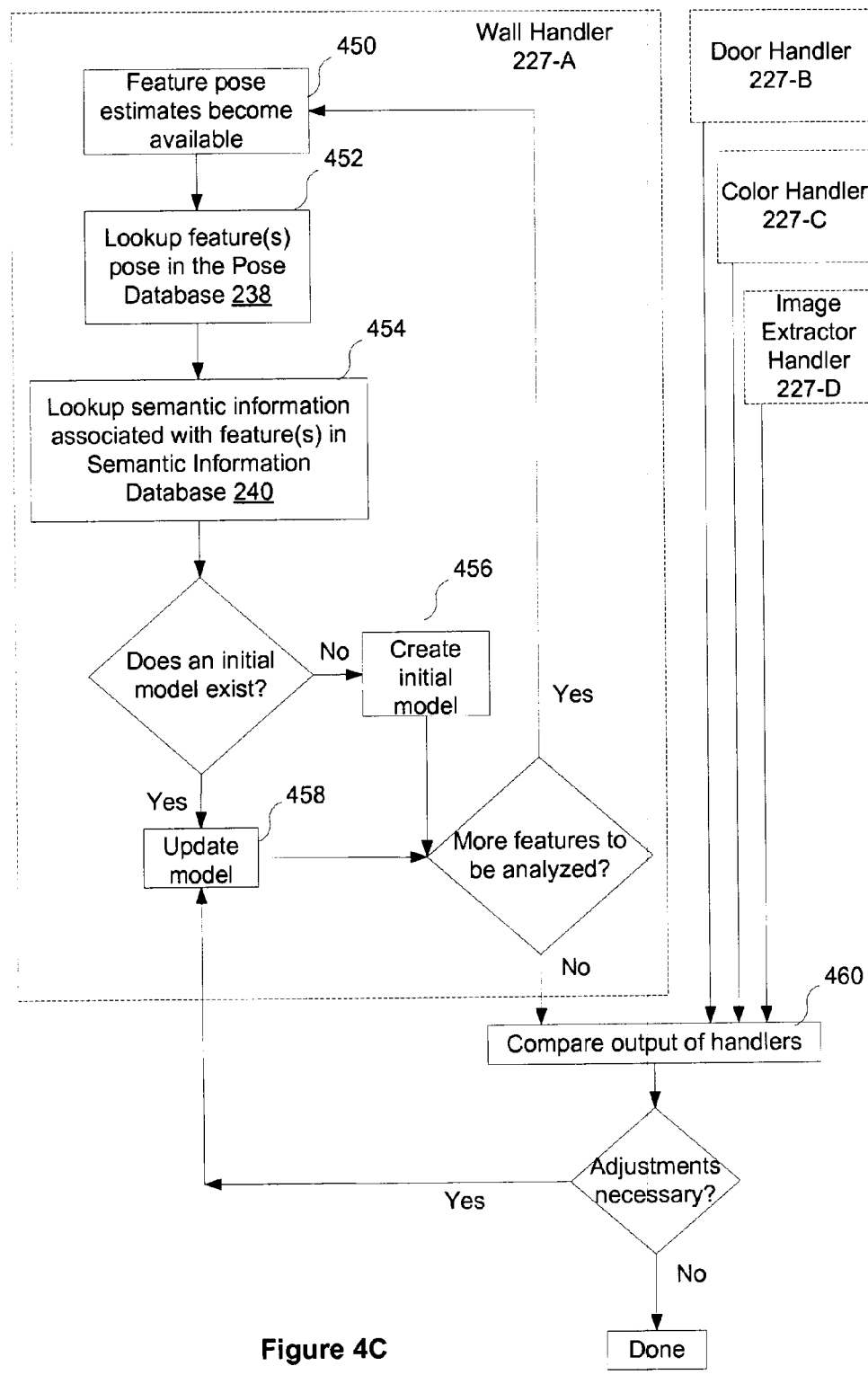
FIG. 4C is a flow chart illustrating a method by which aspects of a model may be determined in accordance with some embodiments.

Attention is now directed towards FIG. 4C, which illustrates a method by which a model may be defined using the markup language described above in accordance with some embodiments. The model builder 226 may contain a number of handlers for handling different meanings from the markup language. In some embodiments the markup handlers may include one or more of the following: a wall markup handler 227-A, a door markup handler 227-B, a color markup handler 227-C and an image extractor markup handler 227-D. For wall markers, a wall markup handler 227-A may perform a series of steps. For an identified subset of features (450), the wall markup handler 227-A looks up (452) the features in the feature pose database 238. In some embodiments semantic information associated with the features is looked up in the semantic information database 240. In some embodiments, an initial model of the walls may be created by the wall markup handler based on constraints imposed by the pose of the markers and the associated semantic information (456). If there is a model that has already been created, additional features may be analyzed to update the model (458). For example, if the door markup handler 227-B determines that there is a door in a wall, the door markup handler updates the model so that there is a hole in the wall that the door can fit into.

For example, in a physical space (e.g., 110 in FIG. 1A), there may be predefined markers on each of the walls that have associated semantic information which identifies the markers as being associated with planar surfaces that are walls of a room. An initial estimation may be that the physical space has walls that are flat, infinite (or arbitrarily large) planar regions that are oriented in accordance with the pose of the markers associated with the wall. However, in some embodiments, once two or more walls have been identified by individual markers, each of the planar regions may intersect with one or more of the other planar regions. When two of the planar regions are determined to intersect, any portion of either planar region that does not contain any markers may be discarded. This process may include any number of intersecting planar regions. In some embodiments, after the portion of the planar region with no markers has been discarded, another planar region may be expanded along the shared edge if it had been discarded due to an intersection with the planar region which has now been discarded. Similar processes may be used with other planar regions such as a ceiling, a floor or a door. In some embodiments, once the unwanted portions of the planar regions are discarded, the remaining planar regions may form the basis for a model. In other embodiments, once the unwanted portions of the planar regions are discarded, physical parameters indicating a physical relationship, such as the height of the ceiling, the size and shape of the floor, and other dimensions of the room may be determined. In some embodiments a similar process may be used to define walls in a model that do not exist in the physical space, but are indicated in the images of the physical space by predefined markers located in the physical space. It should be understood that similar processes may be used to define a model that contains features that are not planes using constraints indicated by the nature of the non-planar features. In some embodiments additional semantic information, as discussed in greater detail previously with reference to FIG. 3A, may be used to further define the model.

Marker Positioning

Figure 5A:
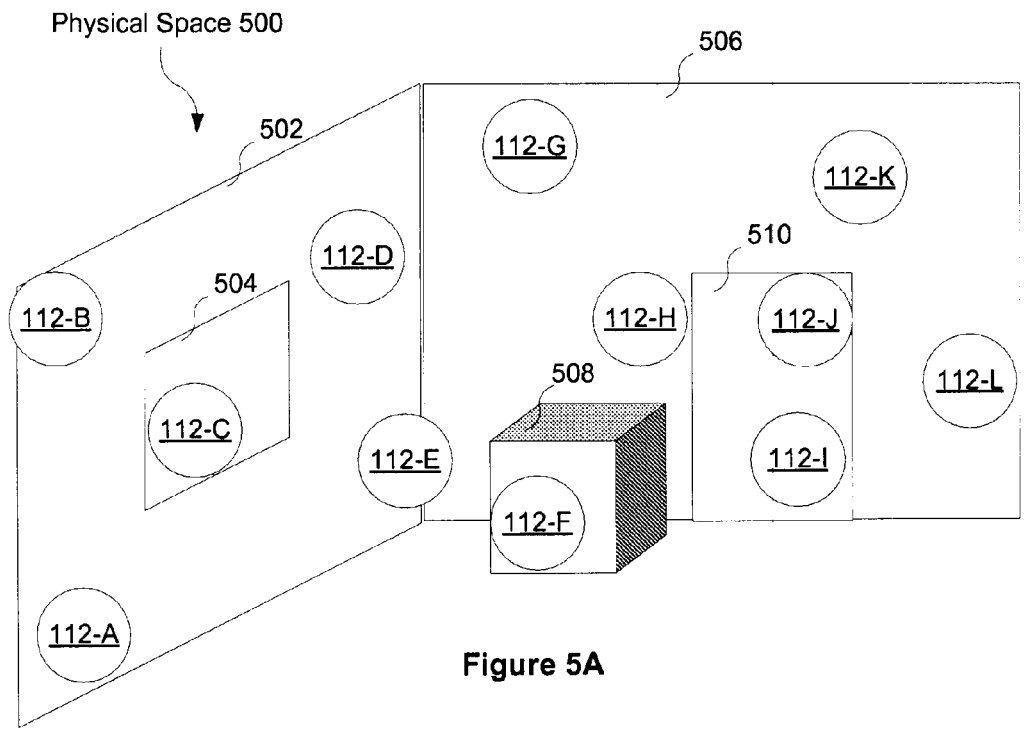
FIG. 5A is a block diagram illustrating a physical space in accordance with some embodiments.
Figure 5B:
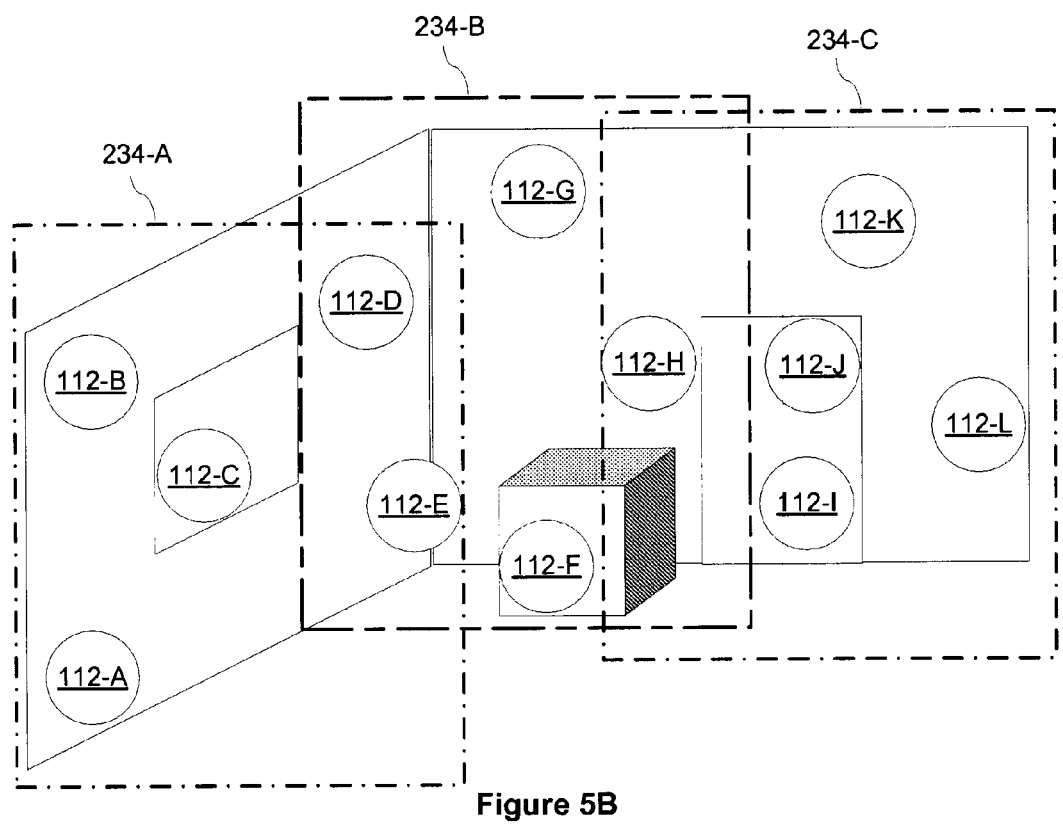
FIG. 5B is a block diagram illustrating images of a physical space in accordance with some embodiments.

Attention is now directed towards FIGS. 5A-5D. FIGS. 5A-5D provide an illustrative example of distinctive visual features 112 arranged in a physical space. In FIG. 5A a plurality of distinctive visual features 112-A-112-L are arranged in a physical space, such as a corner of a room as illustrated in FIGS. 5A and 5B. In some embodiments one or more of these distinctive visual features 112 is a predefined marker. Predefined markers may be associated with various physical elements in a physical space 500 by a user. These physical elements may be physical objects or other features in the physical space. Predefined markers may be used to indicate information about the actual aspects of the physical space or they may be used to indicate desired aspects of a model. In the block diagram of a physical space 110 in FIG. 5A, the physical space includes: a first wall 502; an element 504 coupled with the first wall 502 but also distinct from the first wall 502 which may be a window or display or poster or other element, or even a region of particular interest on wall 502; a second wall 506; an object 508; and a door 510. A user may associate one or more predefined markers with one or more elements included in the physical space 500. For example, a user may associate one or more markers 112-B, 112-D with the first wall 502. A user may also associate a marker 112-C with an element 504 which may be a window or display or poster or other element distinct from a wall 502. Alternatively, as described below with reference to FIGS. 5D-1, 5D-2, and 5D-3, a user may associate a marker 112-B with an element 504 or may associate one or more markers 112-A, 112-B, 112-D and 112-E with the element 504. A user may also associate a marker 112-G with a second wall 506 that is distinct from the first wall 502. In some embodiments other elements such as the object 508 may be associated with, for example a marker 112-F. A door 510 may be associated with one or more markers 112-J and 112-I. One or more additional distinctive visual features that are not markers 112-H may be identified and used to help determine the physical parameters of the physical space 500 or define a model based at least in part on the physical space. It should be understood that the physical space 500 may contain other elements not described herein, and that those elements may or may not be associated with predefined markers.

In some embodiments, once the one or more predefined markers have been associated with elements in the physical space 500, images 234 are taken of the physical space. In FIG. 5B an exemplary set of images 234-A, 234-B and 234-C is indicated by the dotted lines. In some embodiments, where there is more than one image 234 a subset of the images 234 overlap such that each image 234 shares one or more distinctive visual features 112 with one or more other images 234. For example, a first image 234-A and a second image 234-B overlap, and distinctive visual features 112-D and 112-E are visible in each image. Similarly, the second image 234-B and a third image 234-C overlap and distinctive visual feature 112-H is visible in each image. This can be seen clearly in FIGS. 5C-1, 5C-2 and 5C-3, where the first image 234-A (FIG. 5C-1), the second image 234-B (FIG. 5C-2), and the third image 234-C (FIG. 5C-3) are each shown separately. The requirement, in some embodiments, that the images 234 overlap can be alternately defined by creating a co-visibility graph as follows where each distinctive visual feature as a node on the co-visibility graph and where two nodes are connected by an edge if and only if they are both present in a single image. If this co-visibility graph is connected and contains the fiducial feature and a second distinctive visual feature, then the pose of a second feature can be determined relative to the pose of the fiducial feature.

In embodiments where a sequence of overlapping images is required, it is possible that in some instances there may be two or more regions of a physical space that are of particular interest to a user, but the two or more regions cannot be linked by a sequence of overlapping images. Two regions cannot be linked by a sequence of overlapping images when the regions and distinctive visual features are located such that features from one region cannot be seen in images containing features of another region. In this case, it would be impossible to determine the pose of elements in one of the regions with respect to the pose of elements in the other region with the methods described above. For example, if a shared feature 112-H were removed from FIG. 5B, there would be no way to connect the pose of the features in the first image 234-A and the second image 234-B with the pose of the features in the third image 234-C. In some embodiments this problem is solved by placing a predefined marker in the location of the shared feature 112-H. In some embodiments this predefined marker in the location of shared feature 112-H does not have any associated semantic information and serves primarily to enable the pose of features in the third image 234-C to be determined relative to the pose of features in the first image 234-A and the second image 234-B. Another solution is to select one fiducial feature in each region determine the pose of each of one fiducial feature relative to the other. Again, for example, if the shared feature 112-H did not exist, a user could measure the pose of a first marker 112-A in the first image 234-A and the pose of a second marker 112-L in the third image 234-C with respect to the same coordinate system, and then define both the first feature 112-A and the second feature 112-L as fiducial markers.

One specific example of determining the pose of a subset of features by constructing a co-visibility graph (e.g. a chain of images) is described below with reference to FIG. 5C. In this example, a first distinctive visual feature 112-A is selected as a fiducial feature, the process of determining a final pose of a final distinctive visual feature 112-L would be: ordering the images in FIG. 5C in a sequence (for example a first image 234-A, a second image 234-B and a third image 234-C) and then: determining an image pose of the first image 234-A from the pose of the fiducial feature 112-A; determining a feature pose of a second feature 112-D based on the image pose of image 234-A; determining an image pose of a second image 234-B based on the second feature pose of 112-D; determining a feature pose of a third feature 112-H based on the image pose of the second image 234-B; determining an image pose of the third image 234-C based on the feature pose of a third feature 112-H; and determining a feature pose of a final feature 112-L based on the image pose of the third image 234-C.

Figures 1, 5C:
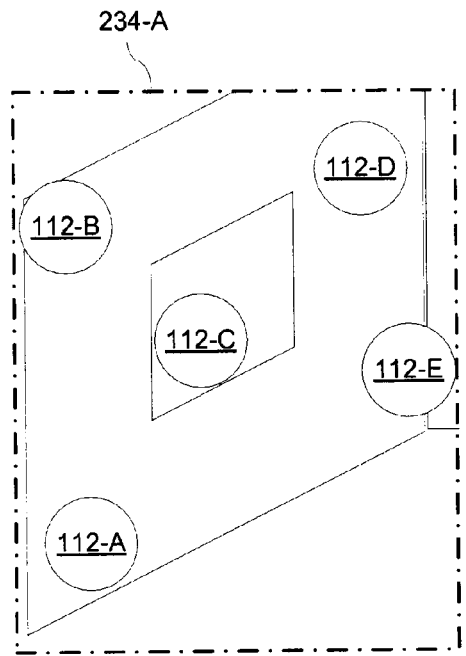
Figures 2, 5C:
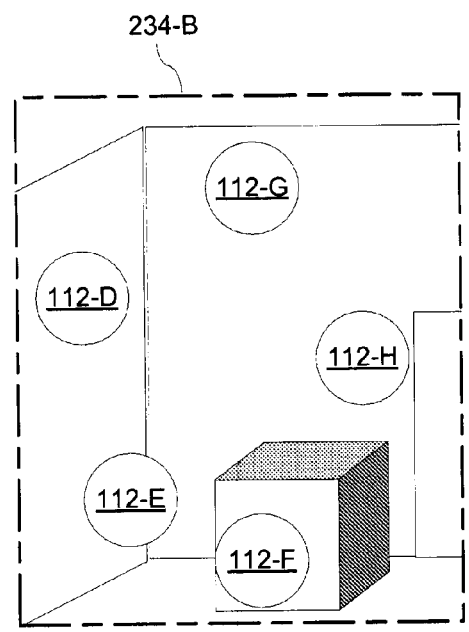
Figures 3, 5C:
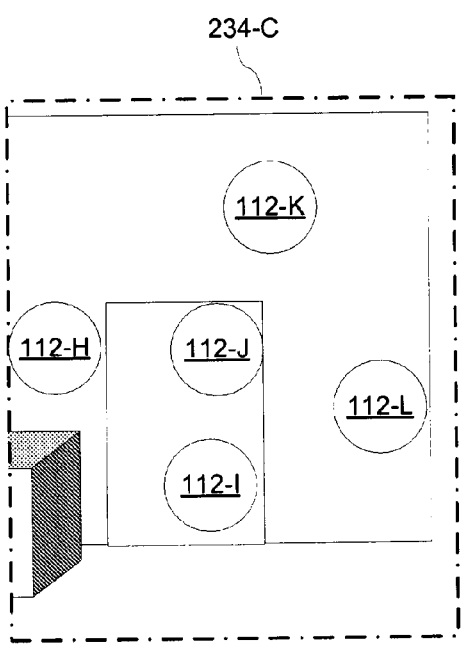

Attention is now directed to FIGS. 5D-1, 5D-2 and 5D-3. These figures illustrate different types of predefined markers that may appear in images of a physical space in accordance with some embodiments. As discussed previously, markers 112 may be associated with physical elements (e.g. physical objects or features) in a physical space (e.g., 500 in FIG. 5A). This association may be accomplished through a variety of means. FIG. 5D-1 illustrates one embodiment of a predefined marker 112-B that is a directly coupled marker 550 that is directly coupled with a physical object 504. FIG. 5D-2 illustrates one embodiment of a predefined marker 112-B with associated semantic information that indicates it is near a corner of a physical object 504. In some embodiments, this type of marker may be called a corner defining marker 522. A set of such markers may directly determine the dimensions of that physical object 504. Alternatively, the meaning associated with a predefined marker 112 may indicate that it is associated with a rectangular physical object 504, and image processing software may be used to detect a rectangle with a corner in proximity to the location indicated by the predefined marker 112. FIG. 5D-3 illustrates one embodiment of predefined markers (e.g., 112-A, 112-B, 112-D and 112-E) that are region defining markers 554 that define the boundaries of a region, and indicate an object (for example element 504) that is located within the indicated boundaries. In some embodiments the shape of an object is indicated and image processing software is used to identify the indicated shape within the boundaries. For example, the semantic information associated with the predefined markers 112 may indicate that they are located around a rectangle. Image processing software may then be used to identify the largest rectangle that is located within the boundaries defined by the predefined markers. Such an embodiment may be particularly useful for associating the predefined markers 112 with an opening, where it is not possible to directly couple a marker to the opening, or for associating predefined markers 112 with a display, window or other object where it would be inconvenient or damaging to directly couple a marker to the object. It should be understood that there are many possible ways to associate a marker with a physical element in a physical space, and one skilled in the art would readily appreciate obvious alternatives to the methods described above.

Embodiments that do not require a predefined marker 112 to be directly coupled with a physical element, such as the embodiments described above, have the additional benefit that the markers do not necessarily have to be positioned precisely relative to the associated physical element. For example, four predefined markers (e.g., 112-A, 112-B, 112-D and 112-E) can be positioned in many different locations and still define boundaries such that image processing software could readily identify the element 504 that is surrounded by the predefined markers (e.g., 112-A, 112-B, 112-D and 112-E). This tolerance to error in placement of predefined markers allows a user to place the markers relatively quickly, because careful measurements are not required.

Figure 6:
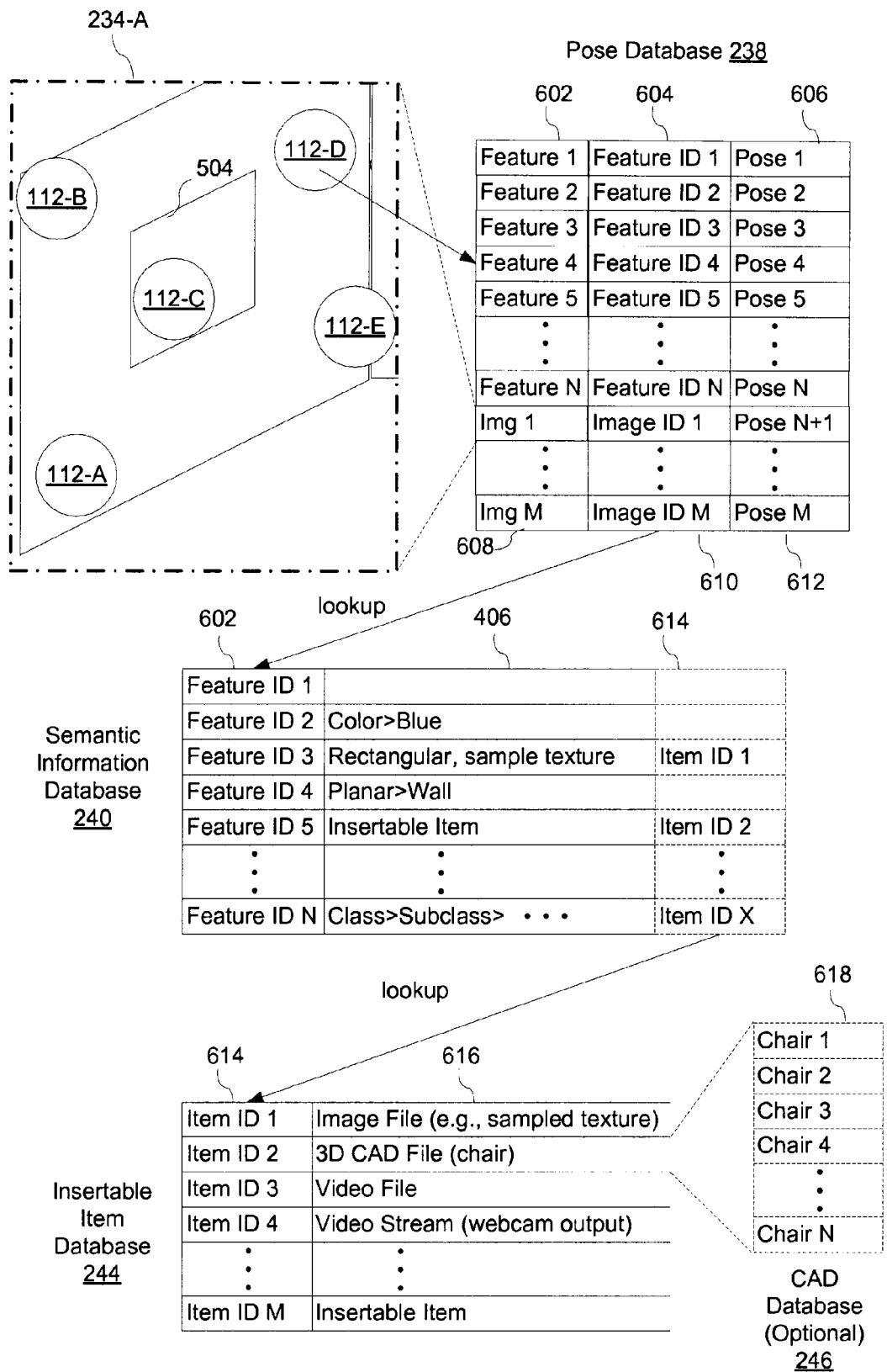
FIG. 6 is a block diagram illustrating a series of lookup tables in accordance with some embodiments.

Attention is now directed to FIG. 6. FIG. 6 illustrates a series of lookup tables in accordance with some embodiments. In some embodiments once images 234 of a physical space have been captured, they may be processed by pose estimator 224 (FIG. 2). Data indicative of one or more of the features 602 may be associated with a feature ID 604 and feature pose information 606. In some embodiments feature pose information may only be available for a subset of the features. In some embodiments, only partial feature pose information may be available for a subset of the features. In other embodiments complete feature pose information may be available for all of the features. Additionally, data indicative of one or more of the images 608 may be associated with an image ID 610, and image pose information 612. In some embodiments the model builder 226 (FIG. 2) selects a subset of features and for each feature in the subset of features the model builder 226 identifies the pose 606 of that feature from the pose database 238, identifies any semantic information 406 associated with the feature from the semantic information database 240 and defines a model, as described above with reference to FIG. 4C. The 3D model renderer 228 (FIG. 2) takes the model and renders a three dimensional model in accordance with the defined model. To insert an insertable item into the model, the 3D model renderer may lookup the insertable item ID 614 in the insertable item database 224 and insert the item 616 associated with that ID into the model. In some embodiments the insertable item 616 is an image file, a video file, a video stream, a 3D CAD file, or other stored file that can be represented visually. In other embodiments, a placeholder item is stored in the insertable item database (e.g., a generic chair), so that the user can specify a type of item without specifying the specific item to place in the model. At a later time, the user can be given the option to select from a number of possible specific items 618 to replace the placeholder item (e.g., picking "Chair 3" out of a CAD Database 246).

In this example, once the poses have been determined and stored in the pose database 238, the model builder 226 may select at least one of the features 112-E and lookup the pose information in the pose database 238. The model builder 226 uses the semantic information associated with the feature that indicates that a chair is to be inserted into a model in that pose (i.e., at that location and orientation). If a specific 3D CAD model of a chair is stored in the insertable item database 244 the 3D model renderer 228 may insert the specific 3D CAD model into the model. If a specific 3D CAD model of a chair is not stored in the insertable item database 224, the 3D model renderer 228 may instead insert a placeholder for a chair in the model, which may be a 3D CAD model of a generic chair or may be another visual indicator that a chair should be placed at the location of the feature 112-E. When a user is presented with the model, the user may be prompted to select a specific 3D CAD model of a chair from the CAD database 246 or upload a specific 3D CAD model of a chair into the insertable item database 244.

Items may also be stored in the insertable item database 244 by the model builder 226. In some embodiments, if the semantic information database 240 indicates that a texture is to be sampled from a physical space and placed in a model, the model builder 226 (FIG. 4A) identifies the texture in the image 234 and stores it in the insertable item database 244. The 3D model renderer 228 may then take the texture from the insertable item database 244 and insert it into the model. For example, if an element 504 is a painting, a set of one or more associated features may have associated semantic information indicating that the element is a rectangular object, and that the model builder 226 should identify the rectangular element associated with the set of feature(s), sample the texture of the element from the image. Semantics associated with these or other markers may indicate that the texture is to be inserted in a particular location in a model. The model builder 226 may then sample the texture and store the portion of an image 234-A containing the texture in the insertable item database 244. In some embodiments, the 3D model renderer 228 (FIG. 4A) may build the model using the model rendering instructions in the model rendering instruction database 242 and then lookup the image file containing the sampled texture in the insertable item database 224 and insert it into the model at the location or locations indicated. It should be understood that these embodiments are merely exemplary and one skilled in the art would readily appreciate obvious alternatives to the methods described above.

Figure 7:
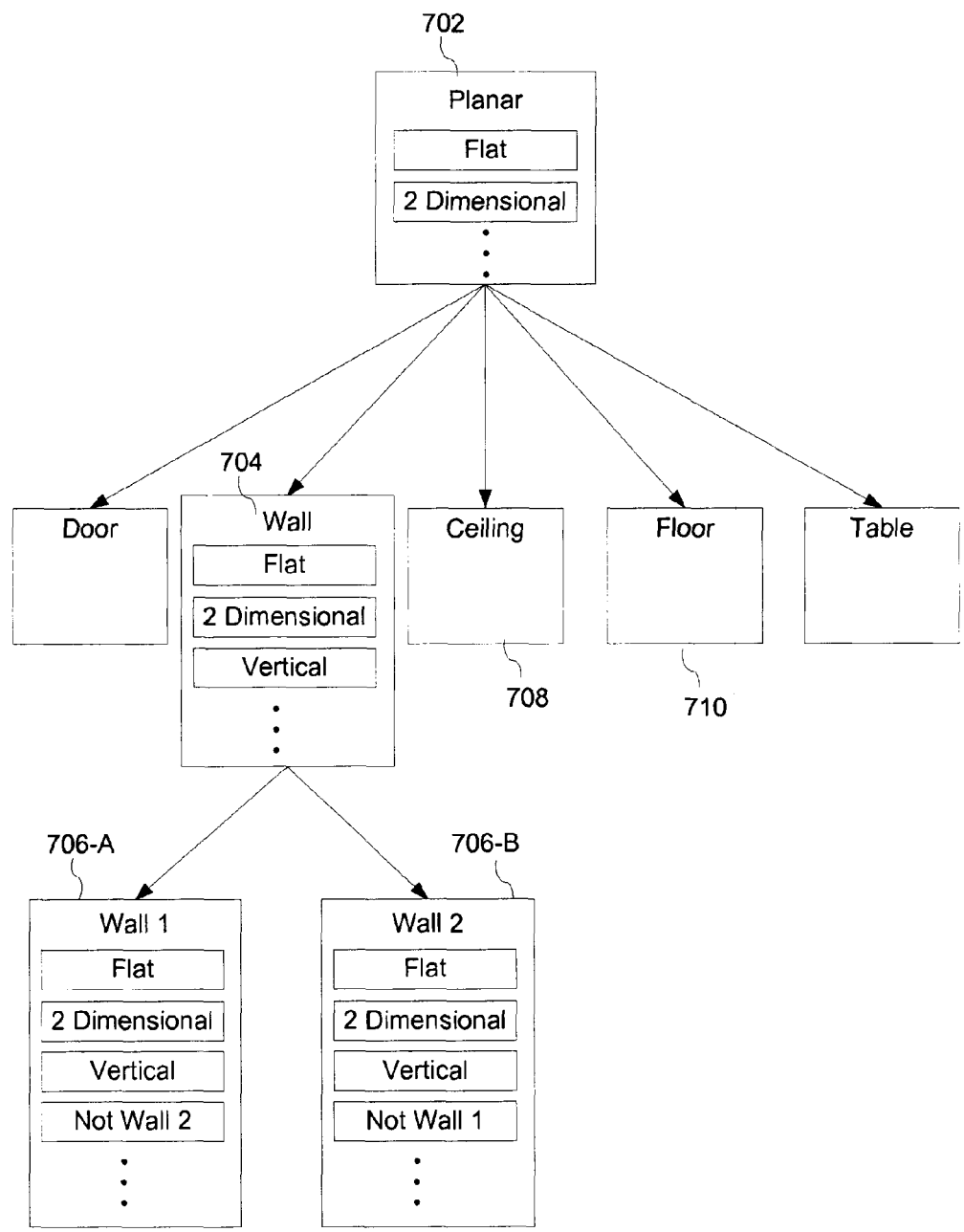
FIG. 7 is a block diagram illustrating a semantic information structure in accordance with some embodiments.

Attention is now directed to FIG. 7. In accordance with some embodiments, the semantic information stored in the semantic information database 240 is categorized into one or more classes and subclasses. Each semantic class and subclass is associated with certain constraints. Features whose associated semantic information includes that class or subclass are subject to those constraints. A schematic diagram illustrating an embodiment of the structure of the semantic information is provided in FIG. 7. In FIG. 7, an example of a semantic information structure related to planar surfaces is described. In this embodiment the semantic information has a hierarchical structure such that each subclass in the hierarchy inherits all of the constraints from the class or subclass to which it belongs. In other embodiments, the subclasses may inherit only some of the constraints of the class to which they belong. While one embodiment of this class inheritance of constraints is illustrated in FIG. 7, it should be understood that this embodiment is merely exemplary and other class inheritance structures may be used instead of, or in conjunction with, the exemplary embodiment.

For example, if an element in a model is associated with a feature that has the associated semantic information "Planar" 702, then the model builder may apply all constraints associated with the class "Planar" to that feature, for example, the constraint that the feature is located on a flat, two dimensional surface. The model builder may also have information indicative of the pose of the feature, which can be used to determine the pose of the plane. Once the pose of the plane has been determined, various aspects of the model (e.g., physical parameters) can be calculated, as previously discussed in reference to FIG. 4C. Additionally, if an element in the model is associated with a feature that has the associated semantic information "Wall" 704, then the model builder may apply all constraints associated with the class "Planar" to the feature, as well as additional constraints. In some embodiments these additional constraints may include that the wall is vertical. Additionally, if an element in the model is associated with a first feature that has the associated semantic information "Wall 1" 706-A, then the model builder may apply all constraints associated with the class "Planar" and the subclass "Wall" to that feature, as well as additional constraints. In some embodiments these additional constraints include that a second feature also has the associated semantic information "Wall 1" in which case the model builder may apply the constraint that both the first feature and the second feature are associated with the same wall in the model. Additionally, in some embodiments, a second feature may have the associated semantic information "Wall 2," in which case the model builder may apply the constraint that the first feature is on a first wall and the second feature is on a second wall where the first wall is distinct from the second wall. In addition, in some embodiments, the subclass "Ceiling" 708 may contain the associated semantic information that the markers lie in a substantially horizontal plane that bounds planes in the subclass "Wall" from the top. Similarly, in some embodiments, the subclass "Floor" 710 may contain the associated semantic information that the markers lie in a substantially horizontal plane that bounds planes in the subclass "Wall" from the bottom.

Figure 8A:
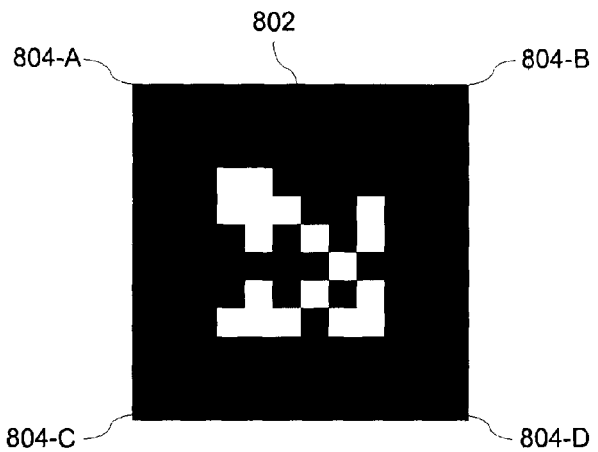
FIG. 8A is a block diagram illustrating an example of a predefined marker in accordance with some embodiments.

Attention is now directed to certain embodiments of the predefined markers 112-1. FIG. 8A illustrates an example of a predefined marker 802 that can be placed in a physical space in accordance with the present invention. In some embodiments, the predefined markers 112-1 satisfy some or all of the following properties: that the markers are easily recognized in an image 234 by image processing software, the markers are visually unique, that the markers can be uniquely identified at large distances, that the markers contain error correction properties, and that the markers are not rotationally symmetric. Some kinds of well known markers such as bar codes and QR codes satisfy at least a subset of these properties. Markers can be many different sizes, depending on what is needed by the user. For close-up pictures that could be used to capture details about a physical space, smaller markers may be more likely to fit entirely within an image of a physical space. For far-away pictures that could be used to capture elements from a larger portion of the physical space, larger markers may be more likely to be visible and recognizable by the camera. In some embodiments, only small markers may be used, in other embodiments only large markers may be used, in yet other embodiments markers of more than one size may be used. Marker size information may be stored in the marker database, which allows for accurate pose estimation in images containing differently sized markers.

In some embodiments markers are identified by image processing software such as ARToolKit or other similar software by converting any color images to black and white by applying a global threshold. In some embodiments to improve marker detection rate and accuracy, when accuracy is of greater importance than efficient use of time and processing power, after a first detection to determine the location of candidate markers, a threshold selection technique can be used on each region of interest before rerunning the imaging processing software, such as ARToolKit. The image processing software may produce a bi-modal intensity histogram for each region of interest, which allows for detection of markers with good accuracy.

In some embodiments the predefined markers 112-1 may have one or more uniform elements that are consistent between markers. In some embodiments, these uniform elements provide three or more points which have known positions relative to a point on the marker and are not collinear. Marker 802 is one embodiment of a predefined marker 112-1. In this embodiment marker 802 has corners 804-A, 804-B, 804-C and 804-D which serve as four points on the marker which have know positions relative to a known point on the marker (e.g., the center of the marker) and are not collinear. Having three or more known points on a marker (that are not collinear), as in the example of marker 802, provides additional information that is helpful in defining a model, which may be based on the physical parameters of a physical space. For example, a plane can be uniquely determined by three non-collinear points. If a marker has a known orientation and associated semantic information indicates that the marker is located on a plane, the orientation of the plane can be determined by looking at a single marker that contains three known, non-collinear, points.

User Implemented Method for Defining a Model

Figure 8B:
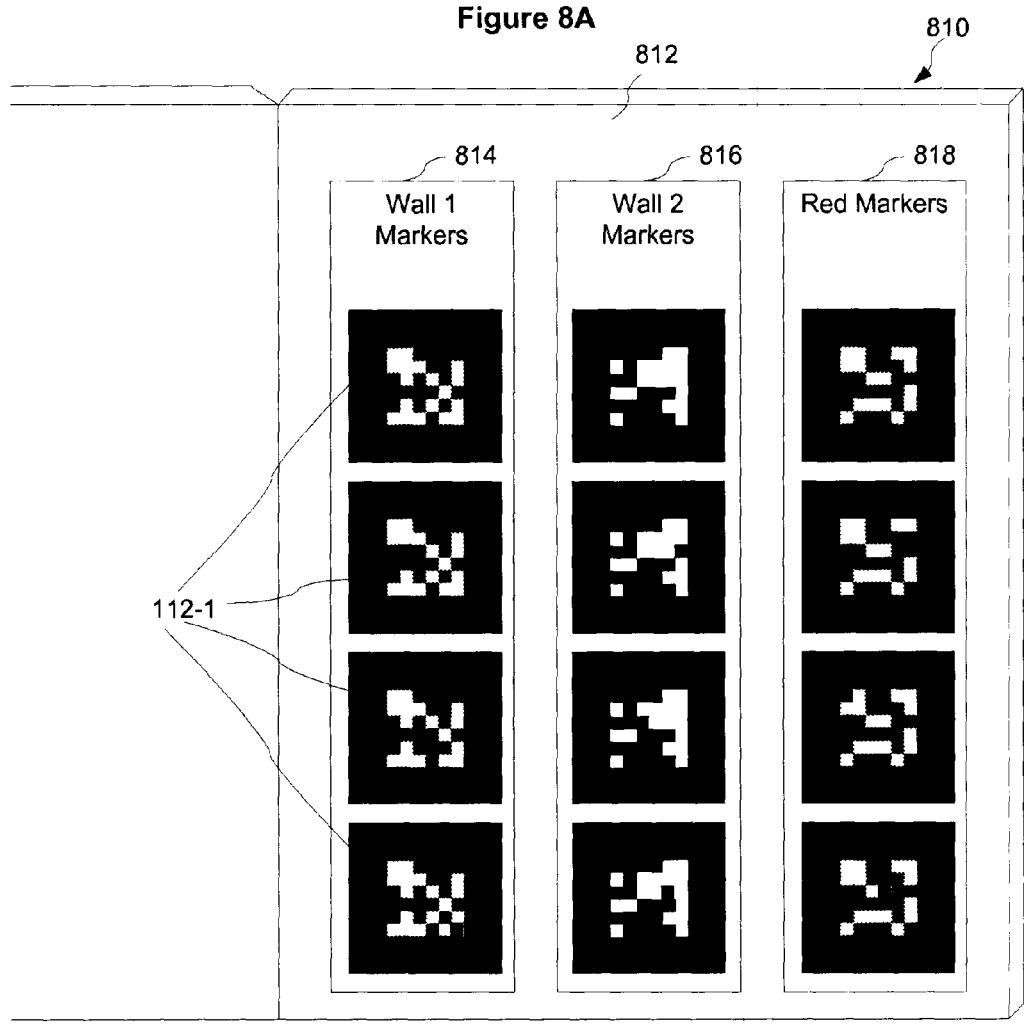
FIG. 8B is a block diagram illustrating an example of a sheet containing predefined markers in accordance with some embodiments.
Figure 8C:
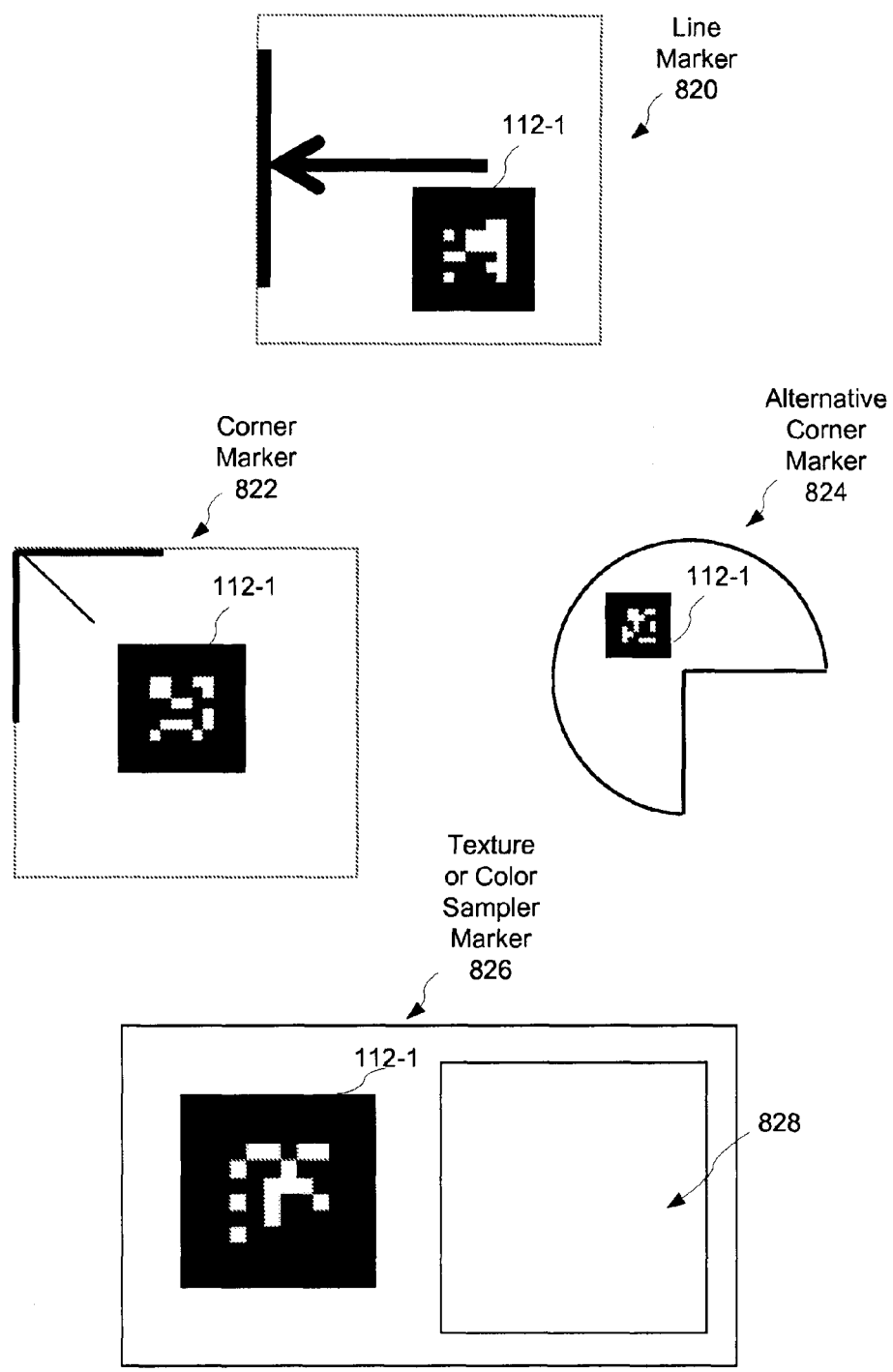
FIG. 8C is a block diagram illustrating exemplary types of predefined markers in accordance with some embodiments.

Attention is now directed to FIGS. 8B-8C. FIG. 8B is a block diagram illustrating a sheet containing predefined markers in accordance with some embodiments. In accordance with some embodiments of the present invention, a plurality of predefined physical markers are created. These predefined markers may be configured to be placed in a physical space. At least some of these markers have associated semantic information. A user is provided with at least a subset of the markers, wherein a first marker in the subset of the markers has an associated label that is indicative of semantic information associated with the first marker. The markers are configured for use with an application program that is capable of defining a model by analyzing images containing one or more of the markers. In some embodiments the application program operates in accordance with the method described previously with respect to FIG. 2. In some embodiments the semantic information is defined in accordance with a markup language that specifies model aspects and rules for combining the semantic information associated with a plurality of the predefined markers.

A user that is provided with predefined markers (e.g. 112-1 FIG. 1A), some of which have associated semantic information, may associate the predefined markers 112-1 with physical elements in a physical space (e.g., 110 FIG. 1A). In some embodiments predefined markers 112-1 are associated with physical objects by attaching the predefined markers 112-1 to the physical elements. The method of attachment may be permanent, semi-permanent or temporary. In some embodiments the user can collect images of the physical space with the markers positioned in the physical space. The user can then use an application program to define the model based on the information from the images 234, and optionally render a model (e.g., 120 FIG. 1A) such as a three dimensional virtual model. In some embodiments the user can intervene at intermediate stages of building the model by providing input to a user interface module (e.g., 221 in FIG. 2). Interventions by the user can be to add information, for example by associating semantic information with various features. Interventions by the user can also be to correct errors in the 3D model renderer, for example by instructing the 3D model renderer to ignore certain images or features or that the pose of one or more features has been estimated poorly.

In some embodiments the user is presented with one or more predefined markers 112-1 in a book 810 containing one or more pages 812. In some embodiments, the predefined markers 112-1 have adhesive backings. The predefined markers 112-1 presented to the user may be grouped in accordance with their associated semantic information and are labeled with symbols indicating their associated semantic information. Grouping markers according to associated semantic information may allow a user to quickly locate a marker that has the appropriate associated semantic information. For example, on a page 812 of markers, the markers may be organized into three groups, "Wall 1 Markers" 814, "Wall 2 Markers" 816, and "Red Markers" 818. In some embodiments the predefined markers 112-1 in the group "Wall 1 Markers" 814 may have associated semantic information that indicates that they are all located on the same flat, planar surface that is substantially vertical, and the predefined markers 112-1 in the group "Wall 2 Markers" 816 may have associated semantic information that indicates that they are all located on the same flat, planar surface that is substantially vertical and is distinct from the surface containing any markers from the group "Wall 1 Markers" 814. In some embodiments the predefined markers 112-1 in the group "Red Markers" 818 have associated semantic information that indicates that the object associated with one of these markers in the model is red. In some embodiments this color may correspond to the color of the physical object associated with the marker, and may be determined by sampling images showing that marker, in other embodiments this color may be a color selected by the user that does not correspond to the color of the physical object associated with the marker. In one embodiment a color sample indicating the color may be printed on the page and associated with the group.

In some embodiments other markers are presented to the user with indications of the associated semantic information. These indications may be graphical indications. These graphical indications may include text. FIG. 8C illustrates examples of some predefined markers 112-1 that have graphical indications of their associated semantic information. Arrows and other graphical symbols that may or may not include words may be printed on a page containing predefined markers 112-1 to indicate the semantic information associated with a predefined marker 112-1 to the user, although the graphical symbols may or may not be a part of the predefined marker 112-1. For example, a line marker 820 may contain associated semantic information that indicates that a line is located proximate to the predefined marker 112-1 and substantially parallel to one edge of the predefined marker 112-1. In order for a user to properly use the marker to indicate a line, the user must know the proper location and orientation of the predefined marker 112-1 with respect to the line. In one embodiment, graphical symbols included in a line marker 820 clearly communicate this information without requiring extensive description. Similarly, a corner marker 822 may use other symbols to identify which corner of the marker should be placed near the corner to be indicated by the corner marker 822. An alternative corner marker 824 may also use alternative symbols to identify which corner of a predefined marker 112-1 should be placed near the corner to be indicated by the corner marker 822. In some embodiments, a texture or color sample marker 826 indicates the size and location of a region that will be sampled for its texture and/or color. In some embodiments the predefined markers 112-1 may be separated from the graphical symbols before being placed in the physical space by or at the direction of a user, while in other embodiments the markers including the graphical symbols may be placed in the physical space. Placing markers that include graphical symbols in the physical space together has the advantage that it may help to guide the user to place the markers more accurately. However, in some instances the graphical symbols may obscure important aspects of the physical space, and thus the user may separate a predefined marker 112-1 from of the graphical symbols and place only the predefined marker 112-1 in the physical space.

Alternative methods of associating semantic information with predefined markers 112-1 are also envisioned. For example, markers could be stored in an electronic device capable of producing predefined markers 112-1. A user could then provide an indication of the required semantic information to the electronic device which could, in accordance with some embodiments, produce one or more predefined markers and store the user indicated semantic information with information indicative of those markers in a semantic information database 240 for use in defining a model that is based at least in part on images of a physical space 110 as described herein.

Dynamic Specification Markers

In some embodiments, aspects of the model are restricted to static aspects, as described previously. In other embodiments aspects of the model may include both static aspects and dynamic aspects. In one embodiment a computer-implemented method for defining a model, includes analyzing one or more images 234 in FIG. 9 of a physical space (e.g., 110 in FIG. 1A) in a static configuration. At least one of the images includes one or more distinctive visual features (e.g., 112 in FIG. 1A). In some embodiments semantic information is associated with the distinctive visual feature and a model is defined in accordance with the associated semantic information. The defined model includes at least one model aspect associated with one or more of the distinctive visual features, wherein the model aspect is capable of dynamic behavior in accordance with the semantic information associated with one or more of the distinctive visual features. Some embodiments may optionally include the step of rendering the dynamic behavior in a viewing application that provides animation scripting and/or uses a dynamic physics modeler such as ODE, Newton, PhysX, etc. In a model that includes dynamic aspects, the model may include joints that define a relationship between two or more objects in the model. A joint between a first object and a second object (e.g., the hinge between a door and a wall) may impose constraints on the position of the first object or the second object or both (e.g., a door may only rotate around the hinge between the door and the wall). Dynamic aspects may include: joint constraints, motion characteristics, material properties, insertion of dynamic elements, and dynamic aspects of the model environment, as described in more detail below.

Figure 9:
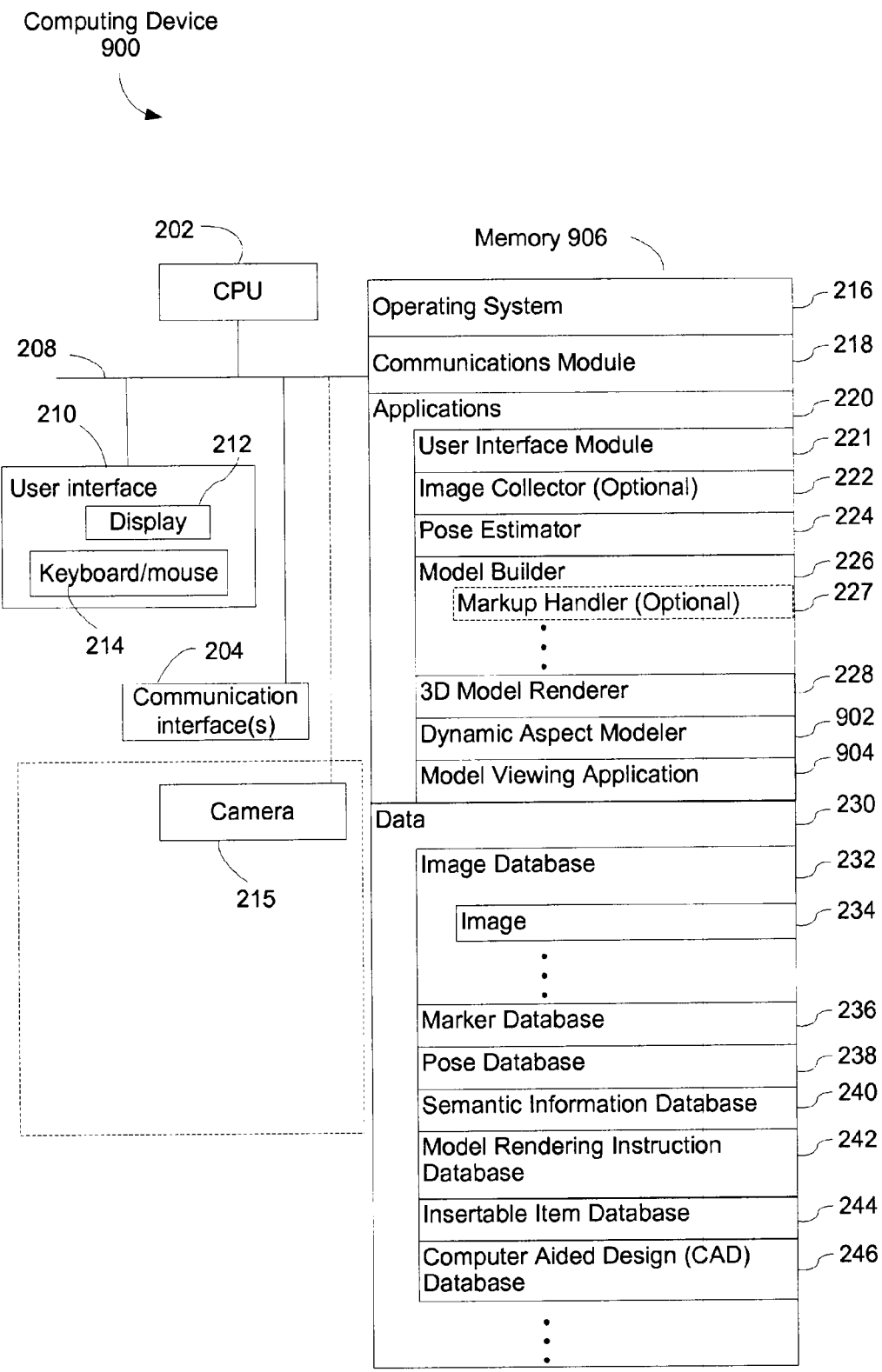
FIG. 9 is a block diagram illustrating a computing device in accordance with some embodiments.

Attention in now directed to FIG. 9 which illustrates one embodiment of a computing device 900 that implements the methods described above. Many of the elements of the computing device 900 are described in more detail previously with reference to computing device 200 and FIG. 2. In some embodiments computing device 900 includes Memory 906 may optionally include mass storage that is remotely located from CPU's 202. Memory 906, or alternately the non-volatile memory device(s) within memory 906, includes a computer readable storage medium. Memory 906 stores the following elements, or a subset of these elements, and may also include additional elements:
  a dynamic aspect modeler 902 that includes procedures for modeling the dynamic aspects of a virtual model, such as joint constraints, motion characteristics, material properties, insertion of dynamic elements and dynamic aspects of the model environment.
  a model viewing application 904 (such as ODE, Newton, PhysX, or other rigid body physics modeler etc.) or other dynamic modeler (such as a VRML browser supporting VRML animations) that includes procedures for determining dynamic behavior of a dynamic three dimensional model and objects in the model based at least in part on the dynamic aspects. In some embodiments a model viewing application may be a rigid body physics engine such as the Open Dynamics Engine. (The Open Dynamics Engine is an open source, high performance library for simulating rigid body dynamics. It has advanced joint types and integrated collision detection with friction.) In some embodiments the dynamic behavior is information indicative of the appropriate response of a model when a user provides input by interacting with an object in the model. In some embodiments, the behavior of dynamic aspects is nonphysical and physics modeling is not required. For example, a model may have a scripted behavior that a door toggles between being open or closed when a user simply clicks on the door. Alternatively, a door may have dynamic aspects including: size, density and friction, and a hinge joint with a wall, which allow a model viewing application to simulate the behavior of the door when the user interacts with it by 'virtually' pushing on it. In this example, the door may rotate if there is input indicative of a user opening the door, and the speed of rotation may be determined by an input indicative of the force with which the user pushed on the door, along with the size, density and friction of the door.
  Additional elements shown in FIG. 9 which correspond to elements in FIG. 2 and are described in greater detail in the specification with reference to FIG. 2.

Figure 10:
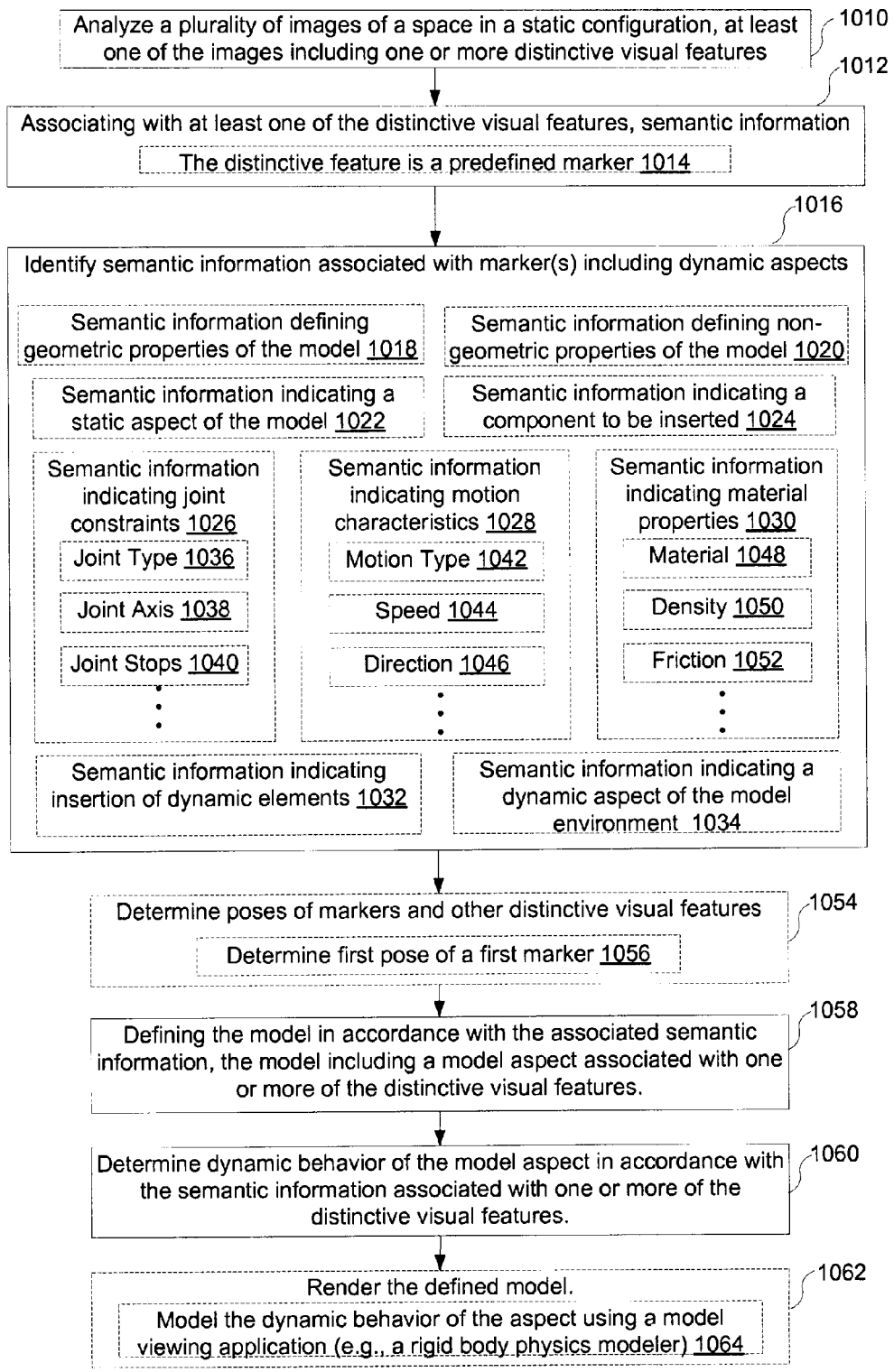
FIG. 10 is a flow chart illustrating a method by which a model with dynamic elements may be defined in accordance with some embodiments.

Attention is now directed towards a description of the method according to some embodiments for defining a model that includes at least some dynamic aspects. FIG. 10 is a flow chart illustrating one embodiment of a method for defining such aspects. In some embodiments one or more images 234 of a space in a static configuration are analyzed (1010) wherein at least one of the images includes one or more distinctive visual features. In some embodiments semantic information is associated with at least one of the distinctive visual features (1012). In some embodiments the distinctive visual feature is a predefined marker (1014). In some embodiments the semantic information associated with the marker or markers is identified (1016). In some embodiments semantic information may be indicative of one or more static aspects of the model, such as: a static characteristic aspect of the model (1022) or a component to be inserted into the model (1024). Semantic information indicative of static aspects of the model is described in more detail above with respect to FIGS. 3A-3B. In some embodiments semantic information may be indicative of one or more dynamic aspects of the model, such as: a geometric property of the model (1018), a non-geometric property of the model (1020), joint constraints (1026), motion characteristics (1028), material properties (1030), insertion of dynamic elements (1032) or a dynamic aspect of the model environment (1034). In some embodiments a dynamic aspect is indicative of a corresponding dynamic aspect of a physical space. In some embodiments a dynamic aspect is not be indicative of any corresponding dynamic aspect of a physical space, but rather may be indicative of a desired dynamic aspect of a virtual model.

In some embodiments semantic information indicating joint constraints indicates a dynamic relationship between at least a first object and a second object in a model. In some embodiments the relationship may be that the range of movement of the first object is constrained relative to the location of the second object. In some embodiments only one type of joint constraint marker is used. In other embodiments a plurality of types of joint constraint markers are used to indicate a dynamic relationship between the first object and the second object. In some embodiments, joint constraints (1026) may include:

- Joint location or anchor, indicating the location of a joint. For example a marker may indicate that a joint is to be located in the model at a position relative to the pose of the marker.
- Joint type (1036), indicating that the first object is fixed relative to the second object, that the first object is separable from the second object or that range of movement of the first object relative to the second object is restricted to: rotating around an axis, sliding in a predefined direction or sliding along a predefined path.
- Joint axis (1038), indicating the axis around which a first object can rotate. In some embodiments the axis may be automatically aligned with an axis of a coordinate system. For example, if a coordinate system is defined so that the z-axis is perpendicular to the floor, a marker indicating a joint axis that is the hinge of a door may be automatically aligned so that it is parallel with the z-axis (e.g., the joint may "snap to vertical")
- Joint stops (1040), indicating a physical extent of motion, such as a maximum angle of travel for the rotational motion or a maximum linear distance of travel for the sliding motion. For example, a joint stop marker may indicate that a door in a wall may not travel more than 90 degrees from parallel with the wall. In another example, a joint stop marker may indicate that drawer in a cabinet may not slide out of the cabinet more than a certain distance. In some embodiments the distance may be predetermined, in other embodiments the distance may be calculated automatically based on the depth of the cabinet.

In some embodiments semantic information indicating motion characteristics (1028) indicates information about the movement of a first object. In some embodiments the movement is relative to a predetermined coordinate system. In other embodiments the movement is relative to a second object in the model. In some embodiments the motion characteristics include motion type (1042) which may indicate that the motion of the first object relative to the second object has a particular character, such as being: rotational (e.g., a motor), reciprocal (e.g., a piston) or linear (e.g., a top view of a conveyor belt). In some embodiments the motion characteristics include speed (1044), which may indicate the speed with which an object or a portion of an object moves relative to another object in the model. In some embodiments speed is indicated by a single predefined marker. In other embodiments speed is indicated by two markers, wherein distance between the markers is indicative of the distance traveled by the object in a predetermined amount of time. For example, two markers placed one meter apart may indicate that the object that they are associated with moves at one meter per second, while two markers placed two meters apart may indicate that the object that they are associated with moves at two meters per second. In some embodiments the motion characteristics include motion direction (1046) which may indicate the direction in which the first object is moving. In some embodiments a single marker may indicate direction (e.g. the direction of motion may be defined relative to the pose of the motion direction marker), in other embodiments more than one marker may be used to indicate the direction of motion (e.g. the direction of motion may be indicated by the direction of motion that would be necessary to move a first marker to the location of a second marker in a straight line.) These markers can be used to indicate, for example, the speed of a conveyor belt, the desired speed of a motor, or the maximum speed of a motor. They can be placed along a line, or on a wheel. Multiple speeds could be indicated in this way by multiple markers, and a control in the model could allow a user to choose one of these speeds.

In some embodiments semantic information indicating material properties (1030), indicates characteristics of the material of an objects in the model. In some embodiments a certain type of object indicated by a first marker may have default material properties (e.g., a default door may be made of wood), and a second marker may have associated additional semantic information about the object, wherein the additional semantic information includes alternative material properties of the object including material properties that differ from and override at least some of the default material properties (e.g., a marker may indicate that the door is made of metal instead of the default wood). In some embodiments material properties may include a material type marker (1048) that indicates the material density, friction and bounce. In some embodiments the material density (1050), material friction (1052) and material coefficient of restitution (i.e. bounce parameter) may be indicated by separate markers. In some embodiments markers that indicate more specific material properties override the material properties indicated by less specific markers. For example, an object may have a marker that indicates that object is a door (default material type: wood, default material density: solid), a marker that indicates that the object material type is metal (default material density: solid) and a marker that indicates that the object is hollow. In this example, the model builder 226, 3D model renderer 228, dynamic aspect modeler 902 and the model viewing application 904 (FIG. 9) would identify the object as a hollow metal door. In other embodiments more general markers might override more specific markers; in this embodiment the model builder 226, 3D model renderer 228, dynamic aspect modeler 902 and the model viewing application 904 (FIG. 9) would identify the object as a wooden door. In other embodiments a marker might have associated semantic information that indicates that its associated semantic information is to override any conflicting semantic information associated with other markers. In some embodiments static aspects, such as a sampled texture may also be associated with objects in the model, as discussed previously with reference to FIG. 3A.

In some embodiments semantic information indicating the insertion of dynamic elements (1032) may indicate that an element with dynamic aspects is to be inserted in a specified pose relative to a marker with the associated semantic information. In some embodiments the dynamic elements are controls. For example, a marker may indicate that a control should be inserted in the model at a particular location, the control could be a button, switch, handle or slider or other control. The control (e.g., a switch) may be modeled on a control (e.g. a light switch in a room) in the physical space, or may suggest a position to insert a control in the model, where the control does not exist in the physical space. Some controls may have predefined meanings in the resulting model, such as a light switch, which changes the state of lighting in the model. The possible settings between which the controls allow a user to choose may arise from the marker semantics such as the possible speeds for a conveyor which are determined as described in paragraph [0086]. In some embodiments controls may be associated with meanings by a user after the model has been rendered. In some embodiments some controls may not have predefined meanings, but may be automatically assigned meanings by a model builder 226 (in FIG. 2). A control may be automatically assigned a meaning based on its proximity to other dynamic elements, for example, in some embodiments, a marker indicating the insertion of a generic control on a door may be automatically assigned the meaning of "handle," and when selected by a user may open or close the door. In some embodiments, the controls may allow end users interacting with a model to change the colors, textures or lighting within the model. In some embodiments the dynamic elements may be motors, conveyor belts, pulleys, springs, wheels, pendulums and articulated joints (e.g., a robotic arm). All or some of the aspects of these elements may be predefined or they may be defined by a user. In some embodiments the aspects of elements are defined using markers associated with the elements.

In some embodiments semantic information indicates a dynamic aspect of the model environment (1034), such that certain aspects of the model environment can be changed. In some embodiments a dynamic aspect of the model environment may include the lighting of the model, which may indicate the source, direction, intensity or color of the light. For example, in one embodiment, a marker could indicate that the light source in a model is sunlight entering the model through a window in the model; in some embodiments a dynamic aspect of the model environment may be that the direction and intensity of this light changes with the time of day. In one embodiment, a marker could indicate that the light source is a light fixture in the center of the ceiling, in some embodiments a dynamic aspect of the model environment may be that the intensity of the light can be changed by a virtual control (e.g., the light can be turned on, turned off or dimmed). In other embodiments a dynamic aspect of the model environment may include aspects of the model environment such as gravity (e.g., markers may indicate the direction and/or strength of gravity).

In some embodiments a pose of one or more of the markers is determined (1054) as described above. An exemplary method for determining the poses is discussed above in more detail with reference to FIGS. 3A-3B. In some embodiments additional poses of predefined markers and/or other distinctive visual features may be determined by the pose estimator 224 (FIG. 9). In some embodiments the pose of a distinctive visual feature in the physical space is indicative of the pose of a distinctive visual feature in the model. The placement, in the model, of an object associated with a first predefined marker may be determined based on the pose of the first predefined marker (1056). As discussed above with reference to FIG. 9, in some embodiments, dynamic aspects may be modeled by the dynamic aspect modeler 902 (in FIG. 9).

In some embodiments the static aspects of a model are also defined based at least partly on a pose of one of the features and the associated semantic information. An exemplary method for defining the static aspects of a model is described in more detail above with reference to FIGS. 3A-3B and 4A-4C. In some embodiments a model is defined in accordance with the associated semantic information (1058), the model including at least one model aspect associated with one or more of the distinctive visual features. In some embodiments the dynamic behavior of the model is determined in accordance with the semantic information associated with one or more of the distinctive visual features (1060). The defined model may be rendered (1062) using any suitable rendering technique. In some embodiments, the dynamic behavior of one or more dynamic aspects of the defined model is rendered using a model viewing application (1064) (such as a rigid body physics modeler). In some embodiments the defined model is a generalized articulated model. A generalized articulated model may be a model of the type used by physics engines which contain rigid bodies connected by joints, conveyor belts and motors attached to joints as well as some modifiable non-geometric properties such as material, color, texture and lighting. In one embodiment this model is rendered in accordance with a defined model including both static and dynamic aspects. In other embodiments the model is constructed in accordance with static aspects, as discussed in greater detail above with reference to FIG. 3A.

Figure 11:
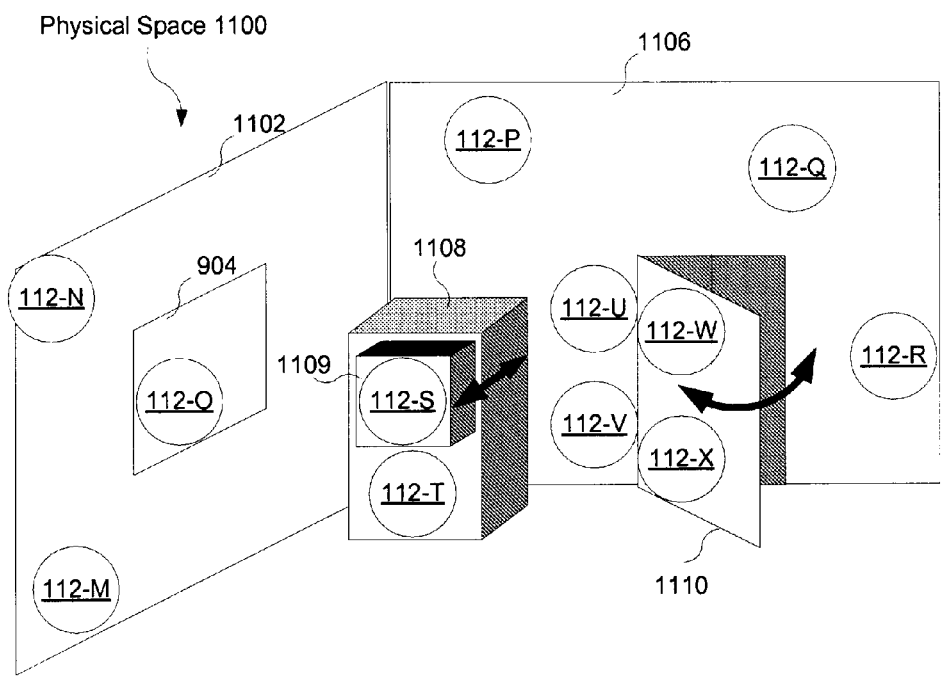
FIG. 11 is a block diagram which illustrating different methods of placing markers in a physical space to indicate desired dynamic behavior of a model in accordance with some embodiments.

Attention is now directed towards FIG. 11, which illustrates different methods of placing markers in a physical space to indicate desired dynamic aspects of a model. FIG. 11 provides an illustrative example of distinctive visual features 112 arranged in a physical space. In FIG. 11 a plurality of distinctive visual features 112-M-112-X are arranged in a physical space 1100, such as a corner of a room as illustrated in FIG. 11. In some embodiments one or more of these distinctive visual features 112 is a predefined marker. Predefined markers may be associated with various physical elements in a physical space 1100 by a user. These physical elements may be physical objects or other features in the physical space 1100. Predefined markers may be used to indicate information about the actual aspects of the physical space or they may be used to indicate desired aspects of a model. In the block diagram of a physical space 1100 in FIG. 11, the physical space includes: a first wall 1102; an element 1104 coupled with the first wall 1102 but also distinct from the first wall 1102 which may be a window, display, poster or other element, or even a region of particular interest on wall 1102; a second wall 1106; an object 1108; and a door 1110. A user may associate one or more predefined markers with one or more elements included in the physical space 1100. For example, a user may associate one or more markers 112-M, 112-N with the first wall 1102. A user may also associate a marker 112-O with an element 1104 which may be a window, display, poster other element distinct from a wall 1102. A user may also associate a marker 112-P with a second wall 1106 that is distinct from the first wall 1102. One or more additional distinctive visual features that are not markers 112-Q may be identified and used to help determine the physical parameters of the physical space 1100 or to define a model based at least in part on the physical space. Additionally, in some embodiments one or more of the elements of the physical space may have dynamic aspects. For example, in one embodiment one or more markers 112-R may indicate that a dynamic element (e.g. a light switch) is to be inserted into the model at a specified location relative to the pose of the marker. Additionally, in some embodiments other dynamic elements such as the object 1108 may be associated with, for example one or more markers 112-S and 112-T. In some embodiments a door 1110 may be a dynamic aspect, the dynamic nature of which may be indicated by one or more associated markers 112-U 112-V, 112-W and 112-X. It should be understood that the physical space 1100 may contain other elements not described herein, and that those elements may or may not be associated with predefined markers. Thus, in addition to the door itself, being a dynamic aspect of the model, the motion characteristics, material properties and joint constraints of the door (which may be indicated by additional markers) may also be dynamic aspects of the model.

For example, in one embodiment a marker 112-R may indicate a control to be inserted into a virtual model. In some embodiments this control may be indicative of a control that is present in the physical space (e.g., a marker indicating a light switch is to be inserted in a model that is placed in the position corresponding to a position of a light switch in the physical space). In other embodiments the control may be a different type of control (e.g., a button or dial instead of a switch) or may insert a control in a location where there is no control in the physical space. For example, even if, in a physical space 1100 a light switch is located on a first wall 1102, a marker inserting a light switch (e.g., 112-R) may be placed on a second wall 1106 instead of on a first wall 1102. In this example, the model created by analyzing images of this physical space 1100 would have a switch on the second wall 1106 and not on the first wall 1102. In one embodiment the dynamic aspect of the model associated with the control insertion marker 112-R may be that the element is a light switch. In this embodiment user selection of this element in the model once the model has been rendered may turn off the lights in the virtual model.

As one example, one or more markers 112-S and 112-T may indicate an object 1108 in the model that has dynamic aspects. In one embodiment the object 1108 may be a cabinet, a first marker 112-T associated with the object may indicate that the object 1108 is a cabinet, it may also indicate default material properties of the object 1108 (e.g. material type: wood, material density: solid and/or material friction coefficient=1). In some embodiments a second marker 112-S associated with the object 1108 may indicate additional aspects that are related to the object. In some embodiments these additional properties may include material properties (e.g., material type: metal, material density: hollow and/or material friction coefficient=2). In other embodiments the second marker 112-S may indicate that the object 1108 has an associated joint type. In this embodiment, the joint type may be that the object 1108 has a slidable element 1109 (e.g., a drawer) with a sliding joint. The associated motion characteristic may indicate that the slidable element 1109 can slide along a predetermined path. In one embodiment the predetermined path is perpendicular to the face of the object 1108. In some embodiments the second marker 112-S also indicates joint stops, these joint stops may include a physical extent of motion, wherein the physical extent includes a maximum angle of travel for the rotational motion or a maximum linear distance of travel for the sliding motion. In the example of a drawer in a cabinet, the joint stop may indicate that slidable element 1109 (e.g. a drawer in a cabinet) has a maximum linear distance of travel that is equal to the depth of the object 1108 (e.g. the depth of the cabinet).

In one embodiment one or more markers 112-U, 112-V, 112-W and 112-X may indicate a door 1110 that is a dynamic aspect of the model. In some embodiments the dynamic behavior of the door indicated by the one or more markers 112-U, 112-V, 112-W and 112-X may be consistent with the dynamic behavior of the door in the physical space; in other embodiments the dynamic behavior of the door indicated by the one or more markers 112-U, 112-V, 112-W and 112-X may be the desired dynamic behavior of the door in the model that are not consistent with the dynamic behavior of the door in the physical space. In some embodiments one or more markers may indicate that a door should be located in the model in a particular location where there is no door in a corresponding location in the physical space. In some embodiments a marker 112-W may indicate that an object is a door 1110 may indicate that the door 1110 has dynamic behavior. For example, the dynamic behaviors may include that the door has a joint with a wall 1106. In an embodiment where the door corresponds to a door in a physical space, if the door in the physical space is partially open in one or more images of the physical space, image processing software may be used to identify which edge of the door is hinged, or whether the door swings in or out; if the door is closed in the images of the physical space, markers may need to be placed on or near the door to indicate this information. In one embodiment, a marker 112-X may indicate that the joint between the wall and the door is a rotational joint where the door swings into the physical space 1100. In another embodiment markers 112-U and 112-V on the wall 1106 may indicate that the door 1110 has a rotational joint with the wall. Additionally, in some embodiments markers on the wall 112-U and 112-V or markers on the door 112-W and 112-X may indicate a joint axis. As discussed previously, in some embodiments the joint axis may snap to vertical. In some embodiments joint stops may be indicated by a marker (e.g., 112-U), in other embodiments the model builder 2204 (FIG. 9) or another application may be able to automatically determine joint stops for the door hinge by recognizing the wall 1106 to which the door is attached and another wall (e.g., 1102) or object (e.g., 1108) that it cannot penetrate.

Additionally, in some embodiments one of the markers 112-W associated with the door 1110 may indicate additional dynamic aspects of the model such as motion characteristics of the door (e.g., that it is a constantly revolving door). In some embodiments, a first one of the markers may indicate an object and first semantic information that includes default dynamic aspects; and a second one of the markers may have associated second semantic information about the object, which may include alternative dynamic aspects of the object including second dynamic aspects that differ from and override at least some of the default dynamic aspects. For example in physical space 1100 a first marker 112-X associated with the door 1110 may indicate that the object is a door and may include associated semantic information that includes default dynamic aspects of the door 1110. These default dynamic aspects may include that the door has a rotational joint with the wall on the right side of the door with a vertical axis, and that the door has the material properties of wood. In some embodiments a second marker 112-W may be associated with the door 1110 and indicate alternative dynamic aspects for the door. For example, the alternative dynamic aspects may indicate that a door has a sliding joint with the wall and is made of glass. In some embodiments the alternative dynamic aspects override at least some of the default dynamic aspects.

One advantage of the embodiments discussed previously with reference to FIGS. 9-11 is that dynamic aspects of a model can be determined from images of a physical space in a static configuration. In other words, in some embodiments, dynamic aspects of a model can be determined from a set of images of a physical space in which nothing has moved. For example, one or more predefined markers can be associated with a door in a physical space where the markers have associated semantic information that indicates that the door is attached to a wall by a hinge and swings into a room but stops at 90 degrees form the wall. By identifying these markers and the associated semantic information in the set of images of a static scene, a dynamic model can be created. It should be understood that the foregoing description of determining dynamic aspects of a model is merely exemplary and that one skilled in the art would recognize that the dynamic aspects described herein could be determined using any combination of the techniques described herein or other techniques known in the art.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for defining a model comprising:
at a computer system having one or more processors and memory storing one or more programs that when executed by the one or more processors cause the computer system to perform the method:
analyzing one or more images of a physical space that include a plurality of distinctive visual features, wherein:
the plurality of distinctive visual features include a first marker associated with first semantic information and a second marker associated with second semantic information;
the first semantic information and the second semantic information are defined in accordance with a markup language that specifies rules for combining semantic information from a plurality of markers; and
analyzing the one or more images includes:
determining a pose of the first marker; and
determining a pose of the second marker; and
defining a model based at least in part on the pose of the first marker, the pose of the second marker, the first semantic information and the second semantic information, wherein defining the model includes:
approximating a first model component based on the pose of the first marker and the first semantic information; and
modifying the first model component based on the pose of the second marker and the second semantic information.

2. The method of claim 1, further comprising:
determining a pose of a respective marker in the physical space; and
defining one or more geometric properties of the model in accordance with the respective marker together with associated semantic information corresponding to the marker.

3. The method of claim 1, further comprising:
defining one or more non-geometric properties of the model in accordance with semantic information associated with a respective marker of the plurality of distinctive visual features.

4. The method of claim 1, wherein:
the model includes a plurality of model aspects; and
at least one of the model aspects is specified in accordance with semantic information associated with a subset of the markers, the subset including at least two markers.

5. The method of claim 4, wherein the semantic information associated with the subset of the markers is used to define a submodel.

6. The method of claim 5, wherein:
the plurality of distinctive visual features include a respective insertion marker associated with the submodel; and,
the respective insertion marker is associated with semantic information indicating that a copy of the submodel is to be inserted into the model with a pose in the model that is determined relative to a pose of the respective insertion marker in the physical space.

7. The method of claim 1, wherein the plurality of distinctive visual features include a respective marker associated with semantic information indicative of regions of the one or more images that will be included in the model.

8. The method of claim 1, wherein the model includes a plurality of model aspects selected from the set consisting of:
a model component;
a pose of a model component; and
a description of the visual appearance of a model component.

9. The method of claim 1, wherein at least one of the distinctive visual features includes a visual feature identified by an image feature detection algorithm.

10. The method of claim 1, wherein the semantic information associated with one or more predefined markers indicates that an insertable item is to be inserted in the model at a position indicated by the location and orientation of the one or more predefined markers.

11. The method of claim 10, wherein the insertable item is an item selected from the set consisting of: an image, a video stream, and a representation of a three dimensional object.

12. The method of claim 1, wherein the markup language is a hierarchical markup language with class inheritance, where classes correspond to model aspects, and classes include: plane, parametric shape, extrusion, image extraction, item insertion and definition.

13. The method of claim 12, wherein, when the class is plane, subclasses include: door, wall, ceiling, floor and table; and when the aspect class is modifier, the model aspect subclasses include: line and corner.

14. The method of claim 1, further comprising rendering a three dimensional representation of the model.

15. The method of claim 1, wherein modifying the first model component includes:
approximating a second model component based on the pose of the second marker and the second semantic information; and
constraining the first model component based on the approximation of the second model component.

16. A system for defining a model, comprising:
one or more processors;
memory storing one or more modules for execution by the one or more processors, the one or more modules including instructions for:
analyzing one or more images of a physical space that include a plurality of distinctive visual features, wherein:
the plurality of distinctive visual features include a first marker associated with first semantic information and a second marker associated with second semantic information;
the first semantic information and the second semantic information are defined in accordance with a markup language that specifies rules for combining semantic information from a plurality of markers; and
analyzing the one or more images includes:
determining a pose of the first marker; and
determining a pose of the second marker; and
defining a model based at least in part on the pose of the first marker, the pose of the second marker, the first semantic information and the second semantic information, wherein defining the model includes:
approximating a first model component based on the pose of the first marker and the first semantic information; and
modifying the first model component based on the pose of the second marker and the second semantic information.

17. A computer-implemented method for defining a model, comprising:
- at a computer system having one or more processors and memory storing one or more programs that when executed by the one or more processors cause the computer system to perform the method, the method comprising:
  - analyzing a plurality of images of a space in a static configuration, at least one of the images including a plurality of distinctive visual features, wherein the plurality of distinctive visual features include:
    - one or more distinctive visual features corresponding to a physical object in the space in the static configuration; and
    - a predefined marker associated with respective semantic information specifying respective dynamic behavior; and
  - defining a model in accordance with the plurality of distinctive visual features and the respective semantic information, wherein:
    - the model includes a model aspect corresponding to the physical object; and
    - the model aspect is configured to be manipulated in accordance with the respective dynamic behavior specified by the predefined marker.

18. The method of claim 17, wherein the associated semantic information is defined in accordance with a markup language that specifies model aspects and rules for combining the semantic information associated with a plurality of distinctive visual features.

19. The method of claim 17, further comprising:
- determining a pose of a respective distinctive visual feature in the space; and
- defining one or more geometric properties of the model in accordance with a pose of the respective distinctive visual feature together with semantic information associated with the respective distinctive visual.

20. The method of claim 17, further comprising:
- defining non-geometric properties of the model in accordance with semantic information associated with a respective marker of the plurality of distinctive visual features.

21. The method of claim 17, further comprising:
- in the model, modeling the dynamic behavior of the aspect using a rigid body physics modeler.

22. The method of claim 17, wherein the associated semantic information associated with the predefined marker includes at least one of joint constraints, motion properties, material properties and insertion of dynamic elements.

23. The method of claim 22, wherein joint constraints include at least one of joint type, joint axis, joint stops, joint location and joint anchor.

24. The method of claim 22, wherein motion properties include at least one of motion type, speed and direction.

25. The method of claim 22, wherein material properties include at least one of material type, density, friction and bounce parameters such as coefficient of restitution.

26. The method of claim 22, wherein the dynamic elements include interactive controls for controlling, in a model viewing application, dynamic aspects of the model including one or more of object positions, lighting and material colors.

27. The method of claim 23, wherein the joint stops include a physical extent of motion, wherein the physical extent of motion comprises a maximum angle of travel for a rotational motion or a maximum linear distance of travel for a sliding motion.

28. The method of claim 25, wherein a first distinctive visual feature has associated semantic information including default material properties of a model component and a second distinctive visual feature has associated second semantic information including alternative material properties of the model component that differ from and override at least some of the default material properties.

29. A system for defining a model, comprising:
- one or more processors;
- memory storing one or more modules for execution by the one or more processors, the one or more modules including instructions for:
  - analyzing a plurality of images of a space in a static configuration, at least one of the images including a plurality of distinctive visual features, wherein the plurality of distinctive visual features include:
    - one or more distinctive visual features corresponding to a physical object in the space in the static configuration; and
    - a predefined marker associated with respective semantic information specifying respective dynamic behavior; and
  - defining a model in accordance with the plurality of distinctive visual features and the respective semantic information, wherein:
    - the model includes a model aspect corresponding to the physical object; and
    - the model aspect is configured to be manipulated in accordance with the respective dynamic behavior specified by the predefined marker.

* * * * *